United States Patent
Lyu et al.

(10) Patent No.: US 9,844,035 B2
(45) Date of Patent: Dec. 12, 2017

(54) COMMUNICATION METHOD, BASE STATION, USER EQUIPMENT, AND SYSTEM

(71) Applicant: Huawei Technologies Co., Ltd., Shenzhen (CN)

(72) Inventors: Yongxia Lyu, Beijing (CN); Tong Ji, Beijing (CN); Wen Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 93 days.

(21) Appl. No.: 14/862,958

(22) Filed: Sep. 23, 2015

(65) Prior Publication Data
US 2016/0014760 A1 Jan. 14, 2016

Related U.S. Application Data

(63) Continuation of application No. PCT/CN2013/073142, filed on Mar. 25, 2013.

(51) Int. Cl.
*H04W 72/04* (2009.01)
*H04B 7/26* (2006.01)
(Continued)

(52) U.S. Cl.
CPC ...... *H04W 72/0406* (2013.01); *H04B 7/2615* (2013.01); *H04B 7/2618* (2013.01);
(Continued)

(58) Field of Classification Search
None
See application file for complete search history.

(56) References Cited

U.S. PATENT DOCUMENTS

| 7,558,238 B1 | 7/2009 | Sun et al. |
| 2004/0213144 A1 | 10/2004 | Murakami et al. |

(Continued)

FOREIGN PATENT DOCUMENTS

| CN | 101820406 A | 9/2010 |
| CN | 101826907 A | 9/2010 |

(Continued)

OTHER PUBLICATIONS $3^{rd}$ Generation Partnership Project; Technical Specification Group Radio Access Network; Evolved Universal Terrestrial Radio Access (E-UTRA); Physical Channels and Modulation (Release 8); 3GPP TS 36.211, V8.6.0, pp. 1-83, $3^{rd}$ Generation Partnership Project, Valbonne, France (Mar. 2009).

*Primary Examiner* — Chi H Pham
*Assistant Examiner* — Shick Hom
(74) *Attorney, Agent, or Firm* — Leydig, Voit & Mayer, Ltd.

(57) ABSTRACT

A communication method, a base station, user equipment, and a system are provided. The method includes: receiving uplink data that is sent by the user equipment in a specified multiple-access manner on a time-frequency resource corresponding to the specified multiple-access manner; and sending downlink data to the user equipment in a corresponding multiple-access manner on a time-frequency resource corresponding to the corresponding multiple-access manner, where the corresponding multiple-access manner is a multiple-access manner that is obtained by searching a at least two multiple-access manners according to a prestored correspondence and that is associated with the specified multiple-access manner. In this way, a problem that because one multiple-access manner is used in a same communications system, requirements of different user equipments cannot be met at the same time is resolved.

20 Claims, 9 Drawing Sheets

(51) Int. Cl.
*H04W 48/18* (2009.01)
*H04W 28/16* (2009.01)
*H04W 88/02* (2009.01)
*H04W 88/08* (2009.01)

(52) U.S. Cl.
CPC .......... *H04W 28/16* (2013.01); *H04W 48/18* (2013.01); *H04W 88/02* (2013.01); *H04W 88/08* (2013.01)

(56) References Cited

U.S. PATENT DOCUMENTS

| | | | |
|---|---|---|---|
| 2006/0268786 | A1 | 11/2006 | Das et al. |
| 2008/0130612 | A1 | 6/2008 | Gorokhov et al. |
| 2011/0110323 | A1 | 5/2011 | Kim et al. |
| 2011/0269410 | A1* | 11/2011 | Tsujimoto ................ H01Q 1/32 455/68 |
| 2013/0061118 | A1* | 3/2013 | Pi .......................... H04L 1/004 714/807 |

FOREIGN PATENT DOCUMENTS

| | | |
|---|---|---|
| EP | 1701458 A2 | 9/2006 |
| EP | 1763155 A1 | 3/2007 |
| JP | 2008546244 A | 12/2008 |
| JP | 2010130209 A | 6/2010 |
| JP | 2011109477 A | 6/2011 |
| JP | 2011160417 A | 8/2011 |
| WO | WO 2006124336 A2 | 11/2006 |
| WO | WO 2009082127 A2 | 7/2009 |

\* cited by examiner

COMMUNICATION METHOD, BASE STATION, USER EQUIPMENT, AND SYSTEM

CROSS-REFERENCE TO RELATED APPLICATIONS

This application is a continuation of International Patent Application No. PCT/CN2013/073142, filed on Mar. 25, 2013, which is hereby incorporated by reference in its entirety.

TECHNICAL FIELD

The present invention relates to the field of communications technologies, and in particular, to a communication method, a base station, user equipment, and a system.

BACKGROUND

In a wireless communications system, receiving and sending of data at a specific logical location is referred to as a multiple-access manner, and specific logical locations are categorized according to time, a frequency, or a spreading code word. The system implements communication between a base station and multiple user equipments in a multiple-access manner.

In the prior art, a communications system implements communication between a base station and user equipment in one multiple-access manner. For example, in a communications system that uses an OFDMA (Orthogonal Frequency Division Multiple Access) multiple-access manner, a base station sends downlink data to different user equipments by using different subcarriers, and the user equipments send uplink data to the base station by using the corresponding subcarriers. Because the base station and the different user equipments perform communication by using subcarriers orthogonal to each other, in the communications system using the OFDMA multiple-access manner, the different user equipments do not interfere with each other, and therefore, strong interference immunity is available.

During a process of implementing the present invention, the inventor finds that the prior art has at least the following problems: Because in a communications system, one multiple-access manner is used throughout to implement communication between a base station and user equipments, disadvantages of the used multiple-access manner accompany with advantages of the multiple-access manner. In a future M2M (machine to machine) service, requirements of different types need to be met in a same network. For example, in a communications system, there may be user equipment in an environment such as a basement or a mine, and therefore, it is required that the communications system have strong coverage, and the requirement of the communications system can be met in an OFDMA multiple-access manner. However, for user equipment that requires high rate transmission or needs to transmit a large amount of small data in the communications system, the requirement cannot be met in an OFDMA multiple-access manner.

SUMMARY

To resolve a problem that because one multiple-access manner is used in an existing communication system, requirements of different user equipments cannot be met at the same time, embodiments of the present invention provide a communication method, a base station, user equipment, and a system. The technical solutions are as follows:

According to a first aspect, a communication method is provided, which is used on a side of a base station and includes:

receiving uplink data that is sent by user equipment in a specified multiple-access manner on a time-frequency resource corresponding to the specified multiple-access manner, where the specified multiple-access manner is a multiple-access manner selected by the user equipment from at least two multiple-access manners according to a predetermined condition; and sending downlink data to the user equipment in a corresponding multiple-access manner on a time-frequency resource corresponding to the corresponding multiple-access manner, where the corresponding multiple-access manner is a multiple-access manner that is obtained by searching the at least two multiple-access manners according to a prestored correspondence and that is associated with the specified multiple-access manner, where the at least two multiple-access manners include at least two of a first multiple-access manner, a second multiple-access manner, and a third multiple-access manner, the first multiple-access manner is an Orthogonal Frequency Division Multiple Access OFDMA multiple-access manner or a Single-carrier Frequency-Division Multiple Access SC-FDMA multiple-access manner, the second multiple-access manner is an OFDMA+Code Division Multiple Access CDMA multiple-access manner or an SC-FDMA+CDMA multiple-access manner, and the third multiple-access manner is an OFDMA+Interleaver-Division Multiple Access IDMA multiple-access manner or an SC-FDMA+IDMA multiple-access manner.

With reference to the first aspect, in a first possible implementation manner of the first aspect, before the receiving uplink data that is sent by user equipment in a specified multiple-access manner on a time-frequency resource corresponding to the specified multiple-access manner, the method further includes:

sending a correspondence between the at least two multiple-access manners and the time-frequency resource to the user equipment according to a predetermined sending manner, where the predetermined sending manner includes: a notification by using a system broadcast or a notification by using signaling.

With reference to the first possible implementation manner of the first aspect, in a second possible implementation manner, before the sending a correspondence between the at least two multiple-access manners and the time-frequency resource to the user equipment according to a predetermined sending manner, the method further includes:

generating the correspondence between the at least two multiple-access manners and the time-frequency resource according to a predetermined categorization manner, where the predetermined categorization manner includes any one of three manners: categorization according to a time domain, categorization according to a frequency domain, and categorization according to a time-frequency domain.

With reference to the first aspect or the first or second possible implementation manner of the first aspect, in a third possible implementation manner, before the sending downlink data to the user equipment in a corresponding multiple-access manner on a time-frequency resource corresponding to the corresponding multiple-access manner, the method further includes:

storing a one-to-one correspondence between the specified multiple-access manner and the corresponding multiple-access manner, where the one-to-one correspondence includes:

if the specified multiple-access manner is the first multiple-access manner, the corresponding multiple-access manner is the first multiple-access manner;

if the specified multiple-access manner is the second multiple-access manner, the corresponding multiple-access manner is the second multiple-access manner; and if the specified multiple-access manner is the third multiple-access manner, the corresponding multiple-access manner is any one of the first multiple-access manner, the second multiple-access manner, and the third multiple-access manner.

With reference to the first aspect or the first, second, or third possible implementation manner of the first aspect, in a fourth possible implementation manner, the sending downlink data to the user equipment in a corresponding multiple-access manner on a time-frequency resource corresponding to the corresponding multiple-access manner includes:

searching for a corresponding multiple-access manner corresponding to a specified multiple-access manner that is most recently used by the user equipment; and sending the downlink data to the user equipment in the found corresponding multiple-access manner on the time-frequency resource corresponding to the corresponding multiple-access manner.

With reference to the first aspect or the first, second, third, or fourth possible implementation manner of the first aspect, in a fifth possible implementation manner, after the sending downlink data to the user equipment in a corresponding multiple-access manner on a time-frequency resource corresponding to the corresponding multiple-access manner, the method further includes:

if a receiving feedback of the user equipment for the downlink data is not received, sending again the downlink data to the user equipment in another multiple-access manner different from the corresponding multiple-access manner in the at least two multiple-access manners.

With reference to the first aspect or the first, second, third, fourth, or fifth possible implementation manner of the first aspect, in a sixth possible implementation manner, the predetermined condition includes a multiple-access manner selection range, and before the sending a correspondence to the user equipment, the method further includes:

sending signaling used for configuring the multiple-access manner selection range to the user equipment, where the multiple-access manner selection range is a selectable range when the user equipment selects a multiple-access manner from the at least two multiple-access manners according to the predetermined condition.

According to a second aspect, a communication method is provided, which is used on a side of user equipment and includes:

acquiring a correspondence between at least two multiple-access manners and a time-frequency resource;

selecting, from the at least two multiple-access manners according to a predetermined condition, a multiple-access manner as a specified multiple-access manner;

sending uplink data to a base station in the specified multiple-access manner on a time-frequency resource corresponding to the specified multiple-access manner; and receiving downlink data that is sent by the base station in a corresponding multiple-access manner on a time-frequency resource corresponding to the corresponding multiple-access manner, where the corresponding multiple-access manner is a multiple-access manner that is obtained by the base station by searching the at least two multiple-access manners according to a prestored correspondence and that is associated with the specified multiple-access manner, where the at least two multiple-access manners include at least two of a first multiple-access manner, a second multiple-access manner, and a third multiple-access manner, the first multiple-access manner is an Orthogonal Frequency Division Multiple Access OFDMA multiple-access manner or a Single-carrier Frequency-Division Multiple Access SC-FDMA multiple-access manner, the second multiple-access manner is an OFDMA+Code Division Multiple Access CDMA multiple-access manner or an SC-FDMA+CDMA multiple-access manner, and the third multiple-access manner is an OFDMA+Interleaver-Division Multiple Access IDMA multiple-access manner or an SC-FDMA+IDMA multiple-access manner.

With reference to the second aspect, in a first possible implementation manner of the second aspect, the acquiring a correspondence between at least two multiple-access manners and a time-frequency resource includes:

acquiring the prestored correspondence, where the correspondence is a correspondence agreed upon in advance;

or, receiving a correspondence that is sent by the base station according to a predetermined sending manner, where the predetermined sending manner includes: a notification by using a system broadcast or a notification by using signaling.

With reference to the second aspect, in a second possible implementation manner, the predetermined condition includes at least one of the following: a QOS priority of a service type, signal strength, a size of a data block in a service type, and a multiple-access manner selection range, and the selecting, from the at least two multiple-access manners according to a predetermined condition, a multiple-access manner as a specified multiple-access manner includes:

if the predetermined condition includes a QOS priority of a service type, selecting the first multiple-access manner as the specified multiple-access manner when the QOS priority of the service type is relatively high;

if the predetermined condition includes signal strength, selecting the second multiple-access manner as the specified multiple-access manner when the signal strength is less than a first preset threshold;

if the predetermined condition includes a size of a data block in a service type, selecting the third multiple-access manner as the specified multiple-access manner when the size of the data block transmitted in the service type is less than a fourth preset threshold; and if the predetermined condition includes a multiple-access manner selection range, selecting, from a selectable range defined in the multiple-access manner selection range, a multiple-access manner as the specified multiple-access manner.

With reference to the second aspect or the first or second possible implementation manner of the second aspect, in a third possible implementation manner, before the selecting, from the at least two multiple-access manners according to a predetermined condition, a multiple-access manner as a specified multiple-access manner, the method further includes:

prestoring the multiple-access manner selection range, where the multiple-access manner selection range is a multiple-access manner selection range agreed upon in advance;

or, receiving signaling that is used for configuring the multiple-access manner selection range and that is sent by the base station; and storing the multiple-access manner selection range configured by using the signaling.

With reference to the second aspect or the first, second or third possible implementation manner of the second aspect, in a fourth possible implementation manner, there are two or three selectable multiple-access manners in the multiple-access manner selection range, and after the selecting, from the at least two multiple-access manners according to a predetermined condition, a multiple-access manner as a specified multiple-access manner, the method further includes:

determining, at each predetermined time interval, whether a currently used specified multiple-access manner still satisfies the predetermined condition; and if a determining result is that the currently used specified multiple-access manner still satisfies the predetermined condition, keeping the currently used specified multiple-access manner unchanged; or if a determining result is that the currently used specified multiple-access manner does not satisfy the predetermined condition, selecting again, from the at least two multiple-access manners according to the predetermined condition, a multiple-access manner as the specified multiple-access manner.

With reference to the second aspect or the first, second, third, or fourth possible implementation manner of the second aspect, in a fifth possible implementation manner, after the receiving downlink data that is sent by the base station in a corresponding multiple-access manner on a time-frequency resource corresponding to the corresponding multiple-access manner, the method further includes:

receiving the downlink data sent again by the base station, where the downlink data sent again is sent, after the base station does not receive a receiving feedback of the user equipment for the downlink data sent in the corresponding multiple-access manner on the time-frequency resource corresponding to the corresponding multiple-access manner, to the user equipment again in another multiple-access manner different from the corresponding multiple-access manner in the at least two multiple-access manners.

According to a third aspect, a base station is provided, including:

an uplink receiving module, configured to receive uplink data that is sent by user equipment in a specified multiple-access manner on a time-frequency resource corresponding to the specified multiple-access manner, where the specified multiple-access manner is a multiple-access manner selected by the user equipment from at least two multiple-access manners according to a predetermined condition; and a downlink sending module, configured to send downlink data to the user equipment in a corresponding multiple-access manner on a time-frequency resource corresponding to the corresponding multiple-access manner, where the corresponding multiple-access manner is a multiple-access manner that is obtained by searching the at least two multiple-access manners according to a prestored correspondence and that is associated with the specified multiple-access manner received by the uplink receiving module, where the at least two multiple-access manners include at least two of a first multiple-access manner, a second multiple-access manner, and a third multiple-access manner, the first multiple-access manner is an Orthogonal Frequency Division Multiple Access OFDMA multiple-access manner or a Single-carrier Frequency-Division Multiple Access SC-FDMA multiple-access manner, the second multiple-access manner is an OFDMA+Code Division Multiple Access CDMA multiple-access manner or an SC-FDMA+CDMA multiple-access manner, and the third multiple-access manner is an OFDMA+Interleaver-Division Multiple Access IDMA multiple-access manner or an SC-FDMA+IDMA multiple-access manner.

With reference to the third aspect, in a first possible implementation manner of the third aspect, the base station further includes:

a relationship sending module, where the relationship sending module is configured to send a correspondence between the at least two multiple-access manners and the time-frequency resource to the user equipment according to a predetermined sending manner, where the predetermined sending manner includes: a notification by using a system broadcast or a notification by using signaling.

With reference to the first possible implementation manner of the third aspect, in a second possible implementation manner, the base station further includes:

a relationship generating module, configured to generate the correspondence between the at least two multiple-access manners and the time-frequency resource according to a predetermined categorization manner, where the predetermined categorization manner includes any one of three manners: categorization according to a time domain, categorization according to a frequency domain, and categorization according to a time-frequency domain.

With reference to the third aspect or the first or second possible implementation manner of the third aspect, in a third possible implementation manner, the base station further includes:

a relationship storage module, configured to store a one-to-one correspondence between the specified multiple-access manner and the corresponding multiple-access manner, where the one-to-one correspondence includes:

if the specified multiple-access manner is the first multiple-access manner, the corresponding multiple-access manner is the first multiple-access manner;

if the specified multiple-access manner is the second multiple-access manner, the corresponding multiple-access manner is the second multiple-access manner; and if the specified multiple-access manner is the third multiple-access manner, the corresponding multiple-access manner is any one of the first multiple-access manner, the second multiple-access manner, and the third multiple-access manner.

With reference to the third aspect or the first, second, or third possible implementation manner of the third aspect, in a fourth possible implementation manner, the downlink sending module includes:

a search unit and a sending unit, where the search unit is configured to search for a corresponding multiple-access manner that is corresponding to a specified multiple-access manner most recently used by the user equipment and that is received by the uplink receiving module; and the sending unit is configured to send the downlink data to the user equipment in the corresponding multiple-access manner, found by the search unit, on the time-frequency resource corresponding to the corresponding multiple-access manner.

With reference to the third aspect or the first, second, third, or fourth possible implementation manner of the third aspect, in a fifth possible implementation manner, the base station further includes:

a resending module, configured to: if a receiving feedback of the user equipment for the downlink data sent by the downlink sending module is not received, send the downlink data again to the user equipment in another multiple-access manner that is different from the corresponding multiple-access manner in the at least two multiple-access manners.

With reference to the third aspect or the first, second, third, fourth, or fifth possible implementation manner of the third aspect, in a sixth possible implementation manner, the predetermined condition includes a multiple-access manner selection range, and the base station further includes:

a signaling sending module, configured to send signaling used for configuring the multiple-access manner selection range to the user equipment, where the multiple-access manner selection range is a selectable range when the user equipment selects a multiple-access manner from the at least two multiple-access manners according to the predetermined condition.

According to a fourth aspect, user equipment is provided, including:

a relationship acquiring module, configured to acquire a correspondence between at least two multiple-access manners and a time-frequency resource;

a manner selection module, configured to select, according to a predetermined condition from the at least two multiple-access manners acquired by the relationship acquiring module, a multiple-access manner as a specified multiple-access manner;

an uplink sending module, configured to send uplink data to a base station in the specified multiple-access manner, selected by the manner selection module, on a time-frequency resource corresponding to the specified multiple-access manner; and a downlink receiving module, configured to receive downlink data that is sent by the base station in a corresponding multiple-access manner on a time-frequency resource corresponding to the corresponding multiple-access manner, where the corresponding multiple-access manner is a multiple-access manner that is obtained by the base station by searching the at least two multiple-access manners according to a prestored correspondence and that is associated with the specified multiple-access manner, where the at least two multiple-access manners include any two or all three of a first multiple-access manner, a second multiple-access manner, and a third multiple-access manner, the first multiple-access manner is an Orthogonal Frequency Division Multiple Access OFDMA multiple-access manner or a Single-carrier Frequency-Division Multiple Access SC-FDMA multiple-access manner, the second multiple-access manner is an OFDMA+Code Division Multiple Access CDMA multiple-access manner or an SC-FDMA+CDMA multiple-access manner, and the third multiple-access manner is an OFDMA+Interleaver-Division Multiple Access IDMA multiple-access manner or an SC-FDMA+IDMA multiple-access manner.

With reference to the fourth aspect, in a first possible implementation manner of the fourth aspect, the relationship acquiring module includes:

an agreement acquiring unit, configured to acquire the prestored correspondence, wherein the correspondence is a correspondence agreed upon in advance;

or, a relationship receiving unit, configured to receive a correspondence that is sent by the base station according to a predetermined sending manner, wherein the predetermined sending manner comprises: a notification by using a system broadcast or a notification by using signaling.

With reference to the fourth aspect, in a second possible implementation manner, the predetermined condition includes at least one of the following: a QOS priority of a service type, signal strength, a size of a data block in a service type, and a multiple-access manner selection range; and the manner selection module includes:

at least one of a first selection unit, a second selection unit, a third selection unit, and a fourth selection unit, where the first selection unit is configured to: if the predetermined condition includes a QOS priority of the service type, select the first multiple-access manner as the specified multiple-access manner when the QOS priority of the service type is relatively high;

the second selection unit is configured to: if the predetermined condition includes signal strength, select the second multiple-access manner as the specified multiple-access manner when the signal strength is less than a first preset threshold;

the third selection unit is configured to: if the predetermined condition includes a size of a data block in a service type, select the third multiple-access manner as the specified multiple-access manner when the size of the data block transmitted in the service type is less than a fourth preset threshold; and the fourth selection unit is configured to: if the predetermined condition includes a multiple-access manner selection range, select, from a selectable range defined in the multiple-access manner selection range, a multiple-access manner as the specified multiple-access manner.

With reference to the fourth aspect or the first or second possible implementation manner of the fourth aspect, in a third possible implementation manner, the user equipment further includes:

an agreement storage module, configured to prestore the multiple-access manner selection range, where the multiple-access manner selection range is a multiple-access manner selection range agreed upon in advance;

or, a signaling receiving module, configured to receive signaling that is used for configuring the multiple-access manner selection range and that is sent by the base station; and a storage module, configured to store the multiple-access manner selection range that is configured by using the signaling received by the signaling receiving module.

With reference to the fourth aspect or the first, second, or third possible implementation manner of the fourth aspect, in a fourth possible implementation manner, there are two or three selectable multiple-access manners in the multiple-access manner selection range, and the user equipment further includes:

a determining module, configured to determine, at each predetermined time interval, whether a specified multiple-access manner currently used by the uplink sending module still satisfies the predetermined condition;

a keeping module, configured to: if a determining result of the determining module is that the currently used specified multiple-access manner still satisfies the predetermined condition, keep the currently used specified multiple-access manner unchanged; and a reselection module, configured to: if the determining result of the determining module is that the currently used specified multiple-access manner does not satisfy the predetermined condition, select again, from the at least two multiple-access manners according to the predetermined condition, a multiple-access manner as the specified multiple-access manner.

With reference to the fourth aspect or the first, second, third, or fourth possible implementation manner of the fourth aspect, in a fifth possible implementation manner, the user equipment further includes:

a re-receiving module, configured to receive the downlink data sent again by the base station, where the downlink data sent again is sent, after the base station does not receive a receiving feedback of the user equipment for the downlink data sent in the corresponding multiple-access manner on the time-frequency resource corresponding to the corresponding multiple-access manner, to the user equipment again in another multiple-access manner different from the corresponding multiple-access manner in the at least two multiple-access manners.

According to a fifth aspect, a communications system is provided, including the base station according to any one of the possible implementation manners of the third aspect and the user equipment according to any one of the possible implementation manners of the fourth aspect.

According to a sixth aspect, a base station is provided, including:

a processor, a receiver, and a transmitter, where the receiver is configured to receive uplink data that is sent by user equipment in a specified multiple-access manner on a time-frequency resource corresponding to the specified multiple-access manner, where the specified multiple-access manner is a multiple-access manner selected by the user equipment from at least two multiple-access manners according to a predetermined condition; and the transmitter is configured to send downlink data to the user equipment in a corresponding multiple-access manner on a time-frequency resource corresponding to the corresponding multiple-access manner, where the corresponding multiple-access manner is a multiple-access manner that is obtained by the processor by searching the at least two multiple-access manners according to a prestored correspondence and that is associated with the specified multiple-access manner, where the at least two multiple-access manners include at least two of a first multiple-access manner, a second multiple-access manner, and a third multiple-access manner, the first multiple-access manner is an Orthogonal Frequency Division Multiple Access OFDMA multiple-access manner or a Single-carrier Frequency-Division Multiple Access SC-FDMA multiple-access manner, the second multiple-access manner is an OFDMA+Code Division Multiple Access CDMA multiple-access manner or an SC-FDMA+CDMA multiple-access manner, and the third multiple-access manner is an OFDMA+Interleaver-Division Multiple Access IDMA multiple-access manner or an SC-FDMA+IDMA multiple-access manner.

With reference to the sixth aspect, in a first possible implementation manner of the sixth aspect, the processor is specifically configured to agree upon a correspondence with the user equipment in advance;

or, the transmitter is further configured to send a correspondence between the at least two multiple-access manners and the time-frequency resource to the user equipment according to a predetermined sending manner, where the predetermined sending manner includes: a notification by using a system broadcast or a notification by using signaling.

With reference to the first possible implementation manner of the sixth aspect, in a second possible implementation manner, the processor is further configured to generate the correspondence between the at least two multiple-access manners and the time-frequency resource according to a predetermined categorization manner, where the predetermined categorization manner includes any one of three manners: categorization according to a time domain, categorization according to a frequency domain, and categorization according to a time-frequency domain.

With reference to the sixth aspect or the first or second possible implementation manner of the sixth aspect, in a third possible implementation manner, the base station further includes:

a memory, configured to store a one-to-one correspondence between the specified multiple-access manner and the corresponding multiple-access manner, where the one-to-one correspondence includes:

if the specified multiple-access manner is the first multiple-access manner, the corresponding multiple-access manner is the first multiple-access manner;

if the specified multiple-access manner is the second multiple-access manner, the corresponding multiple-access manner is the second multiple-access manner; and if the specified multiple-access manner is the third multiple-access manner, the corresponding multiple-access manner is any one of the first multiple-access manner, the second multiple-access manner, and the third multiple-access manner.

With reference to the sixth aspect or the first, second, or third possible implementation manner of the sixth aspect, in a fourth possible implementation manner, the processor is further configured to search for a corresponding multiple-access manner that is corresponding to a specified multiple-access manner most recently used by the user equipment and that is received by the receiver; and the transmitter is further configured to send the downlink data to the user equipment in the corresponding multiple-access manner, found by the processor, on the time-frequency resource corresponding to the corresponding multiple-access manner.

With reference to the sixth aspect or the first, second, third, or fourth possible implementation manner of the sixth aspect, in a fifth possible implementation manner, the processor is further configured to: if the receiver does not receive a receiving feedback of the user equipment for the downlink data, control the transmitter to send the downlink data again to the user equipment in another multiple-access manner different from the corresponding multiple-access manner in the at least two multiple-access manners.

With reference to the sixth aspect or the first, second, third, fourth, or fifth possible implementation manner of the sixth aspect, in a sixth possible implementation manner, the predetermined condition includes a multiple-access manner selection range, and the transmitter is further configured to send signaling used for configuring the multiple-access manner selection range to the user equipment, where the multiple-access manner selection range is a selectable range when the user equipment selects a multiple-access manner from the at least two multiple-access manners according to the predetermined condition.

According to a seventh aspect, user equipment is provided, including:

a processor, a transmitter, and a receiver, where the processor is configured to acquire a correspondence between at least two multiple-access manners and a time-frequency resource;

the processor is further configured to select, from the at least two multiple-access manners according to a predetermined condition, a multiple-access manner as a specified multiple-access manner;

the transmitter is configured to send uplink data to a base station in the specified multiple-access manner, selected by the processor, on a time-frequency resource corresponding to the specified multiple-access manner; and the receiver is configured to receive downlink data that is sent by the base station in a corresponding multiple-access manner on a time-frequency resource corresponding to the corresponding multiple-access manner, where the corresponding multiple-access manner is a multiple-access manner that is obtained by the base station by searching the at least two multiple-access manners according to a prestored correspondence and that is associated with the specified multiple-access manner, where the at least two multiple-access manners include at least two of a first multiple-access manner, a second multiple-access manner, and a third multiple-access manner, the first multiple-access manner is an Orthogonal Frequency Division Multiple Access OFDMA multiple-access manner or a Single-carrier Frequency-Division Multiple Access SC-FDMA multiple-access manner, the second multiple-access manner is an OFDMA+Code Division Multiple Access CDMA multiple-access manner or an SC-FDMA+CDMA multiple-access manner, and the third multiple-access manner is an OFDMA+Interleaver-Division Multiple Access IDMA multiple-access manner or an SC-FDMA+IDMA multiple-access manner.

With reference to the seventh aspect, in a first possible implementation manner of the seventh aspect, the processor is specifically configured to acquire the prestored correspondence, where the correspondence is a correspondence agreed upon in advance;

or, the processor is further specifically configured to control the receiver to receive a correspondence that is sent by the base station according to a predetermined sending manner, where the predetermined sending manner includes: a notification by using a system broadcast or a notification by using signaling.

With reference to the seventh aspect, in a second possible implementation manner, the predetermined condition includes at least one of the following: a QOS priority of a service type, signal strength, a size of a data block in a service type, and a multiple-access manner selection range; and the processor is specifically configured to: if the predetermined condition includes a QOS priority of a service type, select the first multiple-access manner as the specified multiple-access manner when the QOS priority of the service type is relatively high;

the processor is further specifically configured to: if the predetermined condition includes signal strength, select the second multiple-access manner as the specified multiple-access manner when the signal strength is less than a first preset threshold;

the processor is further specifically configured to: if the predetermined condition includes a size of a data block in a service type, select the third multiple-access manner as the specified multiple-access manner when the size of the data block transmitted in the service type is less than a fourth preset threshold; and the processor is further specifically configured to: if the predetermined condition includes a multiple-access manner selection range, select, from a selectable range defined in the multiple-access manner selection range, a multiple-access manner as the specified multiple-access manner.

With reference to the seventh aspect or the first or second possible implementation manner of the seventh aspect, in a third possible implementation manner, the user equipment further includes:

a memory, where the memory is configured to prestore the multiple-access manner selection range, where the multiple-access manner selection range is a multiple-access manner selection range agreed upon in advance;

or, the receiver is further configured to receive signaling that is used for configuring the multiple-access manner selection range and that is sent by the base station; and the memory is further configured to store the multiple-access manner selection range that is configured by using the signaling received by the receiver.

With reference to the seventh aspect or the first, second, or third possible implementation manner of the seventh aspect, in a fourth possible implementation manner, there are two or three selectable multiple-access manners in the multiple-access manner selection range; and the processor is further configured to determine, at each predetermined time interval, whether a specified multiple-access manner currently used by the transmitter still satisfies the predetermined condition;

the processor is further configured to: if a determining result is that the currently used specified multiple-access manner still satisfies the predetermined condition, keep the currently used specified multiple-access manner unchanged; and the processor is further configured to: if a determining result is that the currently used specified multiple-access manner does not satisfy the predetermined condition, select again, from the at least two multiple-access manners according to the predetermined condition, a multiple-access manner as the specified multiple-access manner.

With reference to the seventh aspect or the first, second, third, or fourth possible implementation manner of the seventh aspect, in a fifth possible implementation manner, the receiver is further configured to receive the downlink data sent again by the base station, where the downlink data sent again is sent, when the base station does not receive a receiving feedback of the user equipment for the downlink data sent in the corresponding multiple-access manner on the time-frequency resource corresponding to the corresponding multiple-access manner, to the user equipment again in another multiple-access manner different from the corresponding multiple-access manner in the at least two multiple-access manners.

According to an eighth aspect, a communications system is provided, including the base station according to any one of the possible implementation manners of the sixth aspect and the user equipment according to any one of the possible implementation manners of the seventh aspect.

Beneficial effects of the technical solutions provided in the embodiments of the present invention are as follows:

A base station receives uplink data that is sent by user equipment in a specified multiple-access manner on a time-frequency resource corresponding to the specified multiple-access manner, where the specified multiple-access manner is a multiple-access manner selected by the user equipment from at least two multiple-access manners according to a predetermined condition; and sends downlink data to the user equipment in a corresponding multiple-access manner on a time-frequency resource corresponding to the corresponding multiple-access manner, where the corresponding multiple-access manner is a multiple-access manner that is obtained by searching the at least two multiple-access manners according to a prestored correspondence and that is associated with the specified multiple-access manner. In this way, a problem that because one multiple-access manner is used in a same communications system, requirements of different user equipments cannot be met at the same time is resolved, and an effect of meeting requirements of different user equipments is achieved because a same communications system can provide multiple multiple-access manners at the same time for selection by user equipment.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
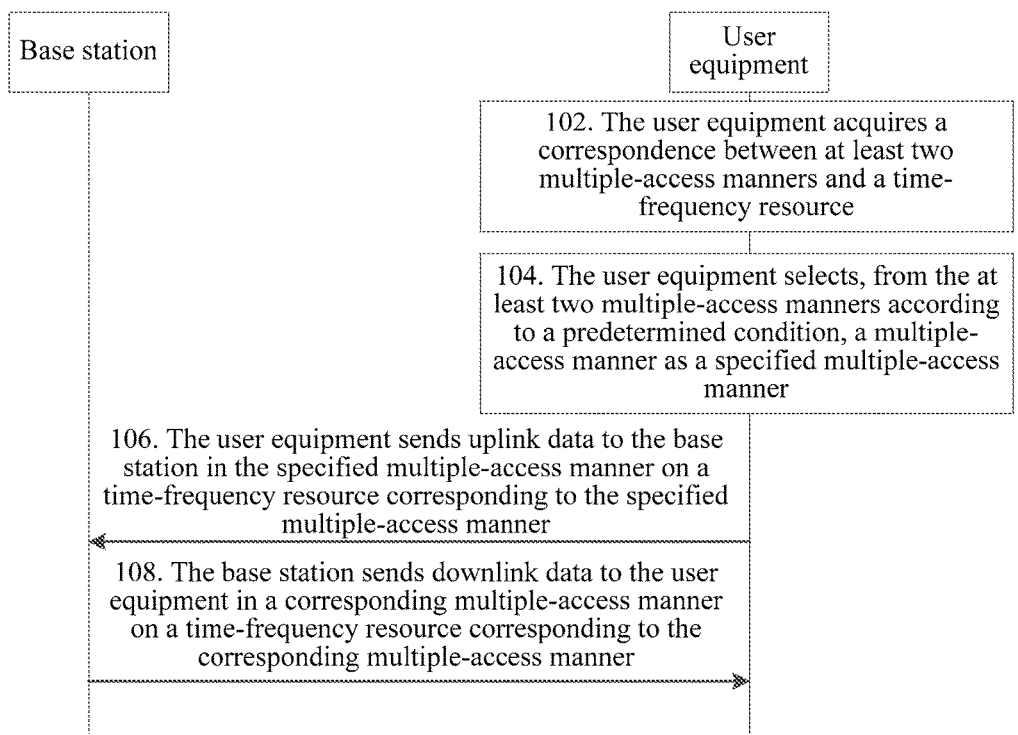
FIG. 1 is a method flowchart of a communication method according to an embodiment of the present invention.

To make the objectives, technical solutions, and advantages of the present invention clearer, the following further describes the embodiments of the present invention in detail with reference to the accompanying drawings.

Embodiments of the present invention provide two or more multiple-access manners for user equipment, so that the user equipment can flexibly select, according to a service requirement, a multiple-access manner meeting the service requirement. Three types of multiple-access manners provided in the embodiments of the present invention are briefly introduced as follows:

1. First Multiple-Access Manner

The first multiple-access manner may be an OFDMA (Orthogonal Frequency Division Multiple Access) multiple-access manner or an SC-FDMA (Single-carrier Frequency-Division Multiple Access) multiple-access manner.

The OFDMA multiple-access manner is a multiple-access manner generated on the basis of an OFDM (Orthogonal Frequency Division Multiplexing) modulation technology. In the OFDM modulation technology, a channel is divided into several orthogonal subchannels. High-speed data signals are converted into parallel low-speed sub-data streams and are modulated for transmission on the orthogonal subchannels. Correspondingly, in the OFDMA multiple-access manner, transmission bandwidth is divided into a series of orthogonal subcarrier sets that do not overlap with each other, and different subcarrier sets are allocated to different user equipments for implementing multiple access. Because of a characteristic of the OFDMA multiple-access manner, in a communications system using the OFDMA multiple-access manner, a base station and user equipments transmit communications data by using subcarriers orthogonal to each other. In an ideal case, no interference exists between the user equipments. Further, an OFDMA system dynamically allocates an available bandwidth resource to user equipment that needs a bandwidth resource, which implements optimized utilization of system resources. The SC-FDMA multiple-access manner and the OFDMA multiple-access manner are similar in technology for the most part, and related technical details are not described herein again; however, it should be noted that the SC-FDMA multiple-access manner and the OFDMA multiple-access manner both have advantages of effectively preventing interference, improving spectrum utilization, and transmitting data at a high rate.

2. Second Multiple-Access Manner

The second multiple-access manner is an OFDMA+CDMA (Code Division Multiple Access, Code Division Multiple Access) multiple-access manner or an SC-FDMA+CDMA multiple-access manner.

The OFDMA+CDMA multiple-access manner is a multiple access system of a type combining OFDMA and CDMA. An existing multiple-access manner of this type includes an MC-CDMA (Multi Carrier-Code Division Multiple Access) multiple-access manner, an LDS-OFDMA (Low Density Signature Orthogonal Frequency Division Multiple Access) multiple-access manner, and the like. CDMA is a communications system based on a code division technology and a multiple access technology. In the system, a specific address code is allocated to each user equipment, and different address codes are orthogonal to each other; therefore, the address codes may overlap in time, space, and frequency. A base station modulates communications data, which needs to be transferred and has certain signal bandwidth, by using a pseudo random code whose bandwidth is far greater than the signal bandwidth, so that the signal bandwidth of the original communications data is expanded. After receiving modulated information sent by the base station, the user equipment obtains, by means of a reverse process, the communications data sent by the base station. The type combining OFDMA and CDMA not only has advantages of strong interference immunity and a large capacity of conventional CDMA, but also has a multi-path interference immunity of OFDMA. For example, for an MC-CDMA system, during an actual communication process, an original data stream is first duplicated into N channels of parallel data, and each channel of data is multiplied by one digit of a frequency domain extension code whose length is N and is then modulated for transmission on orthogonal subcarriers, so that a system using an MC-CDMA multiple-access manner not only has advantages of strong interference immunity and a large capacity of conventional CDMA, but also has a multi-path interference immunity of OFDMA.

The SC-FDMA+CDMA multiple-access manner and the OFDMA+CDMA multiple-access manner are similar in technology for the most part, and related technical details are not described herein again; however, it should be noted that the SC-FDMA+CDMA multiple-access manner and the OFDMA+CDMA multiple-access manner both have an advantage of a large coverage area.

3. Third Multiple-Access Manner

The third multiple-access manner is an OFDMA+IDMA (Interleaver-Division Multiple Access) multiple-access manner or an SC-FDMA+IDMA multiple-access manner.

OFDMA+IDMA is a novel multiple-access manner combining OFDMA and IDMA. IDMA uses a chip-level Interleaver corresponding to a unique identifier of user equipment to distinguish user equipment from a channel. Compared with a conventional CDMA system, IDMA has stronger multiple-access interference immunity. A system using the OFDMA+IDMA multiple-access manner has advantages of higher spectrum utilization, a larger system throughput, and housing more user equipments. The SC-FDMA+IDMA multiple-access manner and the OFDMA+IDMA multiple-access manner are similar in technology for the most part, and related technical details are not described herein again; however, it should be noted that the SC-FDMA+IDMA multiple-access manner and the OFDMA+IDMA multiple-access manner have a relatively great advantage of transmitting a large quantity of small data packets.

Referring to FIG. 1, FIG. 1 is a method flowchart of a communication method according to an embodiment of the present invention. In this embodiment, an example in which the communication method is applied to a communications system including a base station and user equipment is mainly used for description. The communication method includes:

Step 102: The user equipment acquires a correspondence between at least two multiple-access manners and a time-frequency resource.

The user equipment acquires the correspondence between the at least two multiple-access manners and the time-frequency resource. The at least two multiple-access manners include at least two of a first multiple-access manner, a second multiple-access manner, and a third multiple-access manner, the first multiple-access manner is an OFDMA multiple-access manner or an SC-FDMA multiple-access manner, the second multiple-access manner is an OFDMA+CDMA multiple-access manner or an SC-FDMA+CDMA multiple-access manner, and the third multiple-access manner is an OFDMA+IDMA multiple-access manner or an SC-FDMA+IDMA multiple-access manner. Multiple-access manners are corresponding to different time-frequency resources.

Step 104: The user equipment selects, from the at least two multiple-access manners according to a predetermined condition, a multiple-access manner as a specified multiple-access manner.

The user equipment selects, from the at least two multiple-access manners according to the predetermined condition, a multiple-access manner as the specified multiple-access manner, where the predetermined condition may include at least one of the following: a QOS priority of a service type, signal strength, a size of a data block in a service type, and a multiple-access manner selection range.

Step 106: The user equipment sends uplink data to the base station in the specified multiple-access manner on a time-frequency resource corresponding to the specified multiple-access manner.

The user equipment sends the uplink data to the base station in the specified multiple-access manner on the time-frequency resource corresponding to the specified multiple-access manner. The specified multiple-access manner is the multiple-access manner selected by the user equipment from the at least two multiple-access manners according to the predetermined condition.

Correspondingly, the base station receives the uplink data that is sent by the user equipment in the specified multiple-access manner on the time-frequency resource corresponding to the specified multiple-access manner.

Step 108: The base station sends downlink data to the user equipment in a corresponding multiple-access manner on a time-frequency resource corresponding to the corresponding multiple-access manner.

The base station sends the downlink data to the user equipment in the corresponding multiple-access manner on the time-frequency resource corresponding to the corresponding multiple-access manner, where the corresponding multiple-access manner is a multiple-access manner that is obtained by the base station by searching the at least two multiple-access manners according to a prestored correspondence and that is associated with the specified multiple-access manner.

Correspondingly, the user equipment receives the downlink data that is sent by the base station in the corresponding multiple-access manner on the time-frequency resource corresponding to the corresponding multiple-access manner.

In conclusion, according to the communication method provided in this embodiment, a base station receives uplink data that is sent by user equipment in a specified multiple-access manner on a time-frequency resource corresponding to the specified multiple-access manner, where the specified multiple-access manner is a multiple-access manner selected by the user equipment from at least two multiple-access manners according to a predetermined condition; and sends downlink data to the user equipment in a corresponding multiple-access manner on a time-frequency resource corresponding to the corresponding multiple-access manner, where the corresponding multiple-access manner is a multiple-access manner that is obtained by searching the at least two multiple-access manners according to a prestored correspondence and that is associated with the specified multiple-access manner. In this way, a problem that because one multiple-access manner is used in a same communications system, requirements of different user equipments cannot be met at the same time is resolved, and an effect of meeting requirements of different user equipments is achieved because a same communications system can provide multiple multiple-access manners at the same time for selection by user equipment.

Figure 2:
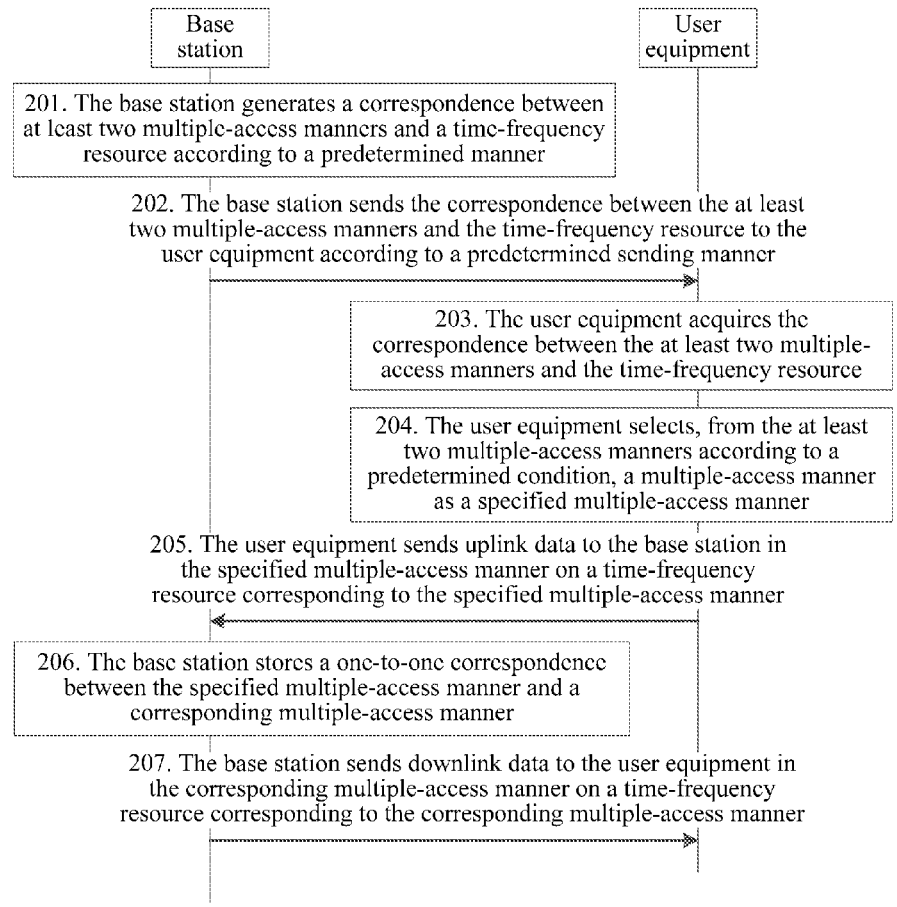
FIG. 2 is a method flowchart of a communication method according to another embodiment of the present invention.

Referring to FIG. 2, FIG. 2 is a method flowchart of a communication method according to another embodiment of the present invention. In this embodiment, an example in which the communication method is applied to a communications system including a base station and user equipment is mainly used for description. The communication method includes:

Step 201: The base station generates a correspondence between at least two multiple-access manners and a time-frequency resource according to a predetermined categorization manner.

The base station generates the correspondence between the at least two multiple-access manners and the time-frequency resource according to the predetermined categorization manner. The predetermined categorization manner includes any one of three manners: categorization according to a time domain, categorization according to a frequency domain, and categorization according to a time-frequency domain. A first multiple-access manner is an OFDMA multiple-access manner or an SC-FDMA multiple-access manner, a second multiple-access manner is an OFDMA+CDMA multiple-access manner or an SC-FDMA+CDMA multiple-access manner, and a third multiple-access manner is an OFDMA+IDMA multiple-access manner or an SC-FDMA+IDMA multiple-access manner.

Figure 3A:
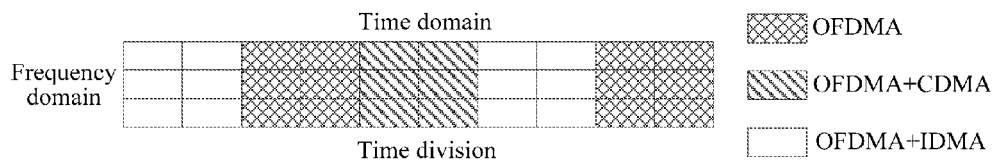
FIG. 3a is a schematic structural diagram of a correspondence between three multiple-access manners and a time-frequency resource in a time division manner according to an embodiment of the present invention.
Figure 3B:
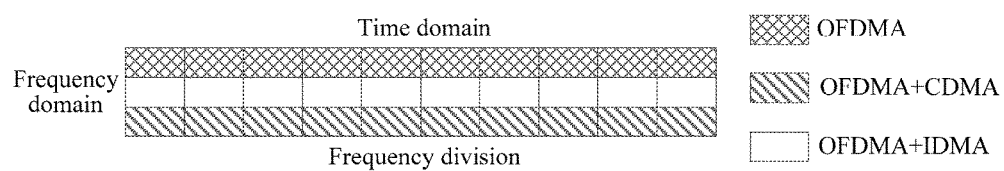
FIG. 3b is a schematic structural diagram of a correspondence between three multiple-access manners and a time-frequency resource in a frequency division manner according to an embodiment of the present invention.
Figure 3C:
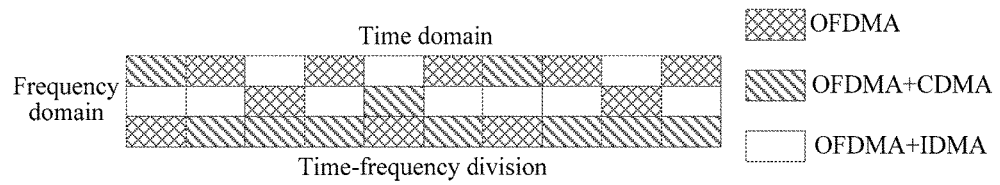
FIG. 3c is a schematic structural diagram of a correspondence between three multiple-access manners and a time-frequency resource in a time-frequency division manner according to an embodiment of the present invention.

In this embodiment of the present invention, that the at least two multiple-access manners include all three of the first multiple-access manner, the second multiple-access manner, and the third multiple-access manner, the first multiple-access manner is the OFDMA multiple-access manner, the second multiple-access manner is the OFDMA+CDMA multiple-access manner, and the third multiple-access manner is the OFDMA+IDMA multiple-access manner is used as an example for description. Referring to FIG. 3a, FIG. 3b, and FIG. 3c, FIG. 3a, FIG. 3b, and FIG. 3c are respectively schematic structural diagrams of correspondences between three multiple-access manners and a time-frequency resource according to three different categorization manners of time division, frequency division, and time-frequency division of the base station in this embodiment of the present invention. The correspondences between the three multiple-access manners and the time-frequency resource according to the three different categorization manners of the time division manner, the frequency division manner, and the time-frequency division manner of the base station can be seen from FIG. 3a, FIG. 3b, and FIG. 3c. Specifically:

First, in the time division manner, the correspondence between the three multiple-access manners and the time-frequency resource:

In the time division manner in FIG. 3a, the OFDMA+IDMA multiple-access manner may be used within a first time period, the OFDMA multiple-access manner may be used within a second time period, the OFDMA+CDMA multiple-access manner may be used within a third time period, and the manners are performed in turn.

Second, in the frequency division manner, the correspondence between the three multiple-access manners and the time-frequency resource is:

In the frequency division manner in FIG. 3b, different frequency bands are separately occupied in the three multiple-access manners. A relatively high frequency band may be occupied in the OFDMA multiple-access manner, a less high frequency band may be occupied in the OFDMA+IDMA multiple-access manner, and a relatively low frequency band may be occupied in the OFDMA+CDMA multiple-access manner.

Third, in the time-frequency division manner, the correspondence between the three multiple-access manners and the time-frequency resource:

In the time-frequency division manner in FIG. 3c, the three multiple-access manners are used in each frequency band within each time period. For example, within a first time period, different frequency bands are separately occupied and used in the OFDMA+CDMA multiple-access manner, the OFDMA+IDMA multiple-access manner, and the OFDMA multiple-access manner. Within a second time period, different frequency bands are also occupied in the three multiple-access manners; however, compared with the first time period, a frequency band occupied in each multiple-access manner may be unchanged, or may be changed.

Step 202: The base station sends the correspondence between the at least two multiple-access manners and the time-frequency resource to the user equipment according to a predetermined sending manner.

The base station sends the correspondence between the at least two multiple-access manners and the time-frequency resource to the user equipment according to the predetermined sending manner, where the predetermined sending manner includes: a notification by using a system broadcast or a notification by using signaling. That is:

First, the base station sends a notification to the user equipment by using a system broadcast, where the notification carries the correspondence.

The base station sends the correspondence between the three multiple-access manners and the time-frequency resource to the user equipment in a manner of sending a notification in a system broadcast. For example, the base station sends, to the user equipment in a manner of sending a notification in a system broadcast, the correspondence generated according to the predetermined categorization manner. If the predetermined manner is categorization according to a frequency domain, the notification sent by the base station in the system broadcast includes the correspondence between the three multiple-access manners and the time-frequency resource shown in FIG. 3b: A relatively high frequency band is occupied in the OFDMA multiple-access manner, a less high frequency band is occupied in the OFDMA+IDMA multiple-access manner, and a relatively low frequency band is occupied in the OFDMA+CDMA multiple-access manner.

Second, the base station sends signaling to the user equipment, where the signaling carries the correspondence.

The base station sends the correspondence between the three multiple-access manners and the time-frequency resource to the user equipment in a manner of sending signaling. For example, the base station sends, to the user equipment in a manner of sending a notification in a system broadcast, the correspondence generated according to a predetermined manner. If the predetermined manner is categorization according to a time-frequency domain, the signaling sent by the base station includes the correspondence between the three multiple-access manners and the time-frequency resource shown in FIG. 3c: Within a first time period, different frequency bands are separately occupied and used in the OFDMA+CDMA multiple-access manner, the OFDMA+IDMA multiple-access manner, and the OFDMA multiple-access manner. Within a second time period, different frequency bands are also occupied in the three multiple-access manners; however, compared with the first time period, a frequency band occupied in each multiple-access manner within the second time period may be unchanged, or may be changed.

Step 203: The user equipment acquires the correspondence between the at least two multiple-access manners and the time-frequency resource.

After the base station sends the correspondence between the at least two multiple-access manners and the time-frequency resource to the user equipment according to the predetermined sending manner, the user equipment may receive the correspondence that is sent by the base station according to the predetermined sending manner, where the predetermined sending manner includes: a notification by using a system broadcast or a notification by using signaling. Then, the user equipment may store the correspondence.

It should be further noted that the acquiring, by the user equipment, the correspondence between the at least two multiple-access manners and the time-frequency resource is not limited to such an approach of receiving a correspondence sent by the base station. In a scenario in which a correspondence between at least two multiple-access manners and a time-frequency resource is agreed upon in advance, the user equipment may prestore the correspondence between the at least two multiple-access manners and the time-frequency resource. Then, when the prestored correspondence needs to be used, the prestored correspondence is acquired, where the correspondence is a correspondence agreed upon in advance.

Step 204: The user equipment selects, from the at least two multiple-access manners according to a predetermined condition, a multiple-access manner as a specified multiple-access manner.

Three multiple-access manners separately have respective advantages. For example: the OFDMA multiple-access manner has an advantage of a high rate; the OFDMA+CDMA multiple-access manner has an advantage of a wide coverage area, and the OFDMA+IDMA multiple-access manner has an advantage of suitability for transmission of a large quantity of small data packets. The user equipment may select a most suitable multiple-access manner according to the predetermined condition, where the predetermined condition may include at least one of the following: a QOS priority of a service type, signal strength, a size of a data block in a service type, and a multiple-access manner selection range. Specifically:

When the user equipment needs the advantage of a high rate, the first multiple-access manner is selected. For example, if the predetermined condition includes a QOS priority of a service type, the first multiple-access manner is selected as the specified multiple-access manner when the QOS (Quality of Service, quality of service) priority of the service type is relatively high.

When the user equipment needs the advantage of a wide coverage area, the second multiple-access manner is selected. For example, if the predetermined condition includes signal strength, the second multiple-access manner is selected as the specified multiple-access manner when the signal strength is less than a first preset threshold.

When the user equipment needs to transmit a large quantity of small data packets, the third multiple-access manner is selected. For example, if the predetermined condition includes a size of a data block in a service type, the third multiple-access manner is selected as the specified multiple-access manner when the size of the data block transmitted in the service type is less than a fourth preset threshold.

If the predetermined condition includes a multiple-access manner selection range, the user equipment selects, from the multiple-access manner selection range, a multiple-access manner as the specified multiple-access manner. For example, if the multiple-access manner selection range of the user equipment is the first multiple-access manner and the second multiple-access manner, the user equipment can select, only from the first multiple-access manner and the second multiple-access manner, a multiple-access manner as the specified multiple-access manner, and cannot select the third multiple-access manner as the specified multiple-access manner.

Step 205: The user equipment sends uplink data to the base station in the specified multiple-access manner on a time-frequency resource corresponding to the specified multiple-access manner.

The user equipment sends the uplink data to the base station in the specified multiple-access manner on the time-frequency resource corresponding to the specified multiple-access manner. Specifically, after selecting the specified multiple-access manner, the user equipment may search, according to the acquired correspondence between the at least two multiple-access manners and the time-frequency resource, for the time-frequency resource corresponding to the specified multiple-access manner, and then, send the uplink data to the base station on the time-frequency resource corresponding to the specified multiple-access manner.

Correspondingly, the base station receives the uplink data that is sent by the user equipment in the specified multiple-access manner on the time-frequency resource corresponding to the specified multiple-access manner.

Step 206: The base station stores a one-to-one correspondence between the specified multiple-access manner and a corresponding multiple-access manner.

Generally, the user equipment sends uplink data to the base station in a multiple-access manner, and the base station also send downlink data to the user equipment in the same multiple-access manner when receiving the uplink data; however, if the user equipment sends uplink data to the base station in the third multiple-access manner, because device complexity required by IDMA in the third multiple-access manner is relatively high, when the user equipment sends the uplink data to the base station in this multiple-access manner, the base station generally sends the downlink data to the user equipment in the first or second multiple-access manner, to avoid increase of device complexity of the user equipment. However, there is a one-to-one correspondence between the multiple-access manner in which the user equipment sends the uplink data and the multiple-access manner in which the base station sends the downlink data. After receiving the uplink data sent by the user equipment, the base station needs to send the downlink data to the user equipment in a multiple-access manner that is obtained according to the correspondence and that is associated with the multiple-access manner in which the user equipment sends the uplink data. Therefore, before sending the downlink data to the user equipment, the base station needs to prestore a one-to-one correspondence between a specified multiple-access manner and a corresponding multiple-access manner. The foregoing one-to-one correspondence includes: if the specified multiple-access manner is the first multiple-access manner, the corresponding multiple-access manner is the first multiple-access manner; if the specified multiple-access manner is the second multiple-access manner, the corresponding multiple-access manner is the second multiple-access manner; and if the specified multiple-access manner is the third multiple-access manner, the corresponding multiple-access manner is any one of the first multiple-access manner, the second multiple-access manner, and the third multiple-access manner.

Step 207: The base station sends downlink data to the user equipment in the corresponding multiple-access manner on a time-frequency resource corresponding to the corresponding multiple-access manner.

After receiving the uplink data that is sent by the user equipment in the specified multiple-access manner on the time-frequency resource corresponding to the specified multiple-access manner, the base station sends the downlink data to the user equipment in the corresponding multiple-access manner, associated with the specified multiple-access manner, on the time-frequency resource corresponding to the corresponding multiple-access manner, where the corresponding multiple-access manner is a multiple-access manner that is obtained by the base station by searching the at least two multiple-access manners according to the prestored correspondence and that is associated with the specified multiple-access manner.

Correspondingly, the user equipment receives the downlink data that is sent by the base station in the corresponding multiple-access manner on the time-frequency resource corresponding to the corresponding multiple-access manner.

In conclusion, according to the communication method provided in this embodiment, user equipment acquires a correspondence between at least two multiple-access manners and a time-frequency resource; a base station receives uplink data that is sent by the user equipment in a specified multiple-access manner on a time-frequency resource corresponding to the specified multiple-access manner; and the base station sends downlink data to the user equipment in a corresponding multiple-access manner on a time-frequency resource corresponding to the corresponding multiple-access manner. In this way, a problem that because one multiple-access manner is used in a same communications system, requirements of different user equipments cannot be met at the same time is resolved, and an effect of meeting requirements of different user equipments is achieved because a same communications system can provide multiple multiple-access manners at the same time for selection by user equipment. In addition, the base station prestores a one-to-one correspondence between the specified multiple-access manner and the corresponding multiple-access manner, so that after receiving the uplink data sent by the user equipment, the base station can send the downlink data to the user equipment in the corresponding multiple-access manner, which is obtained according to the prestored one-to-one correspondence and is associated with the specified multiple-access manner, on the time-frequency resource corresponding to the corresponding multiple-access manner. In this way, a problem that because the base station sends the downlink data in a manner unidentifiable by the user equipment, communication is interrupted is resolved, and an effect of ensuring smoothness of a communication process without significantly increasing device complexity of the user equipment is achieved.

Figure 4:
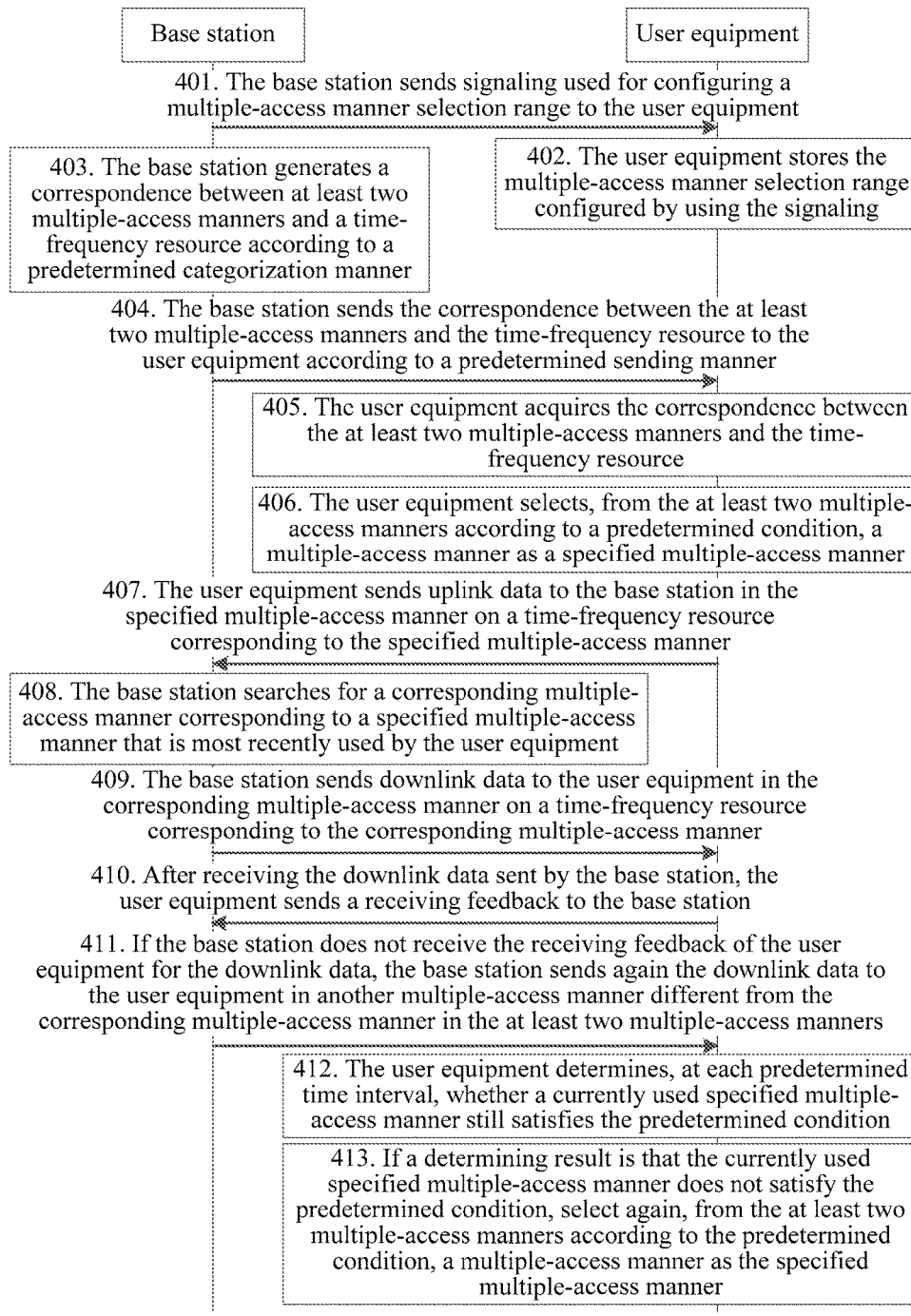
FIG. 4 is a method flowchart of a communication method according to another embodiment of the present invention.

Referring to FIG. 4, FIG. 4 is a method flowchart of a communication method according to another embodiment of the present invention. In this embodiment, an example in which the communication method is applied to a communications system including a base station and user equipment is mainly used for description. The communication method includes:

Step 401: The base station sends signaling used for configuring a multiple-access manner selection range to the user equipment.

In an actual communications system, the base station does not need to provide two or three selectable multiple-access manners to each user equipment, because some user equipments only need to use one multiple-access manner to receive and send data. For example, user equipment located in a basement or a mine may neither need high-rate data transmission nor need to transmit a large quantity of small data packets throughout, and only a coverage area needs to be ensured. In this case, the user equipment only needs to use an OFDMA multiple-access manner throughout. However, some user equipments need to use a plurality of multiple-access manners to receive and send data, for example, user equipment that has varied service types and often moves to different regions for use. In this case, the user equipment may select, from multiple-access manners that can be provided by the base station, an optimal multiple-access manner as required, to exchange information with the base station.

Therefore, before the base station communicates with the user equipment, the base station needs to send the signaling used for configuring the multiple-access manner selection range to the user equipment, where the multiple-access manner selection range is a selectable range when the user equipment selects a multiple-access manner from at least two multiple-access manners. For example, in a communications system, only specific user equipment is allowed to communicate with the base station by using a first multiple-access manner and a second multiple-access manner, or configuration of the user equipment supports only a first multiple-access manner and a second multiple-access manner; therefore, before the base station communicates with the user equipment, the base station sends the signaling used for configuring the multiple-access manner selection range to the user equipment, where the signaling is used for notifying the user equipment that a selectable multiple-access manner range is the first multiple-access manner or the second multiple-access manner.

In this embodiment of the present invention, that the at least two multiple-access manners include all three of the first multiple-access manner, the second multiple-access manner, and a third multiple-access manner is still used as an example for description, where the first multiple-access manner is an OFDMA multiple-access manner or an SC-FDMA multiple-access manner, the second multiple-access manner is an OFDMA+CDMA multiple-access manner or an SC-FDMA+CDMA multiple-access manner, and the third multiple-access manner is an OFDMA+IDMA multiple-access manner or an SC-FDMA+IDMA multiple-access manner. In this embodiment of the present invention, that the first multiple-access manner is the OFDMA multiple-access manner, the second multiple-access manner is the OFDMA+CDMA multiple-access manner, and the third multiple-access manner is the OFDMA+IDMA multiple-access manner is used as an example for description.

Correspondingly, the user equipment receives the signaling that is used for configuring the multiple-access manner selection range and that is sent by the base station.

Step 402: The user equipment stores the multiple-access manner selection range configured by using the signaling.

After receiving the signaling that is used for configuring the multiple-access manner selection range and that is sent by the base station, the user equipment stores the multiple-access manner selection range that is configured by using the signaling sent by the base station.

In another implementation, the multiple-access manner selection range may also be agreed upon in advance. In this case, the user equipment prestores the multiple-access manner selection range, where the multiple-access manner selection range is a multiple-access manner selection range agreed upon in advance.

Step 403: The base station generates a correspondence between at least two multiple-access manners and a time-frequency resource according to a predetermined categorization manner.

The base station generates the correspondence between the at least two multiple-access manners and the time-frequency resource according to the predetermined categorization manner. The predetermined categorization manner includes any one of three manners: categorization according to a time domain, categorization according to a frequency domain, and categorization according to a time-frequency domain.

Referring to FIG. 3a, FIG. 3b, and FIG. 3c, FIG. 3a, FIG. 3b, and FIG. 3c are respectively schematic structural diagrams of correspondences between three multiple-access manners and the time-frequency resource according to three different categorization manners of a time division manner, a frequency division manner, and a time-frequency division manner of the base station in this embodiment of the present invention. The correspondences between the three multiple-access manners and the time-frequency resource in three different categorization manners of the time division manner, the frequency division manner, and the time-frequency division manner provided by the base station can be seen from FIG. 3a, FIG. 3b, and FIG. 3c.

Step 404: The base station sends the correspondence between the at least two multiple-access manners and the time-frequency resource to the user equipment according to a predetermined sending manner.

The base station sends the correspondence between the at least two multiple-access manners and the time-frequency resource to the user equipment according to the predetermined sending manner, where the predetermined sending manner includes: a notification by using a system broadcast or a notification by using signaling.

Step 405: The user equipment acquires the correspondence between the at least two multiple-access manners and the time-frequency resource.

After the base station sends the correspondence between the at least two multiple-access manners and the time-frequency resource to the user equipment according to the predetermined sending manner, the user equipment may receive the correspondence that is sent by the base station according to the predetermined sending manner, where the predetermined sending manner includes: a notification by using a system broadcast or a notification by using signaling. Then, the user equipment may store the correspondence.

It should be further noted that the acquiring, by the user equipment, the correspondence between the at least two multiple-access manners and the time-frequency resource is not limited to such an approach of receiving a correspondence sent by the base station. In a scenario in which a correspondence between at least two multiple-access manners and a time-frequency resource is agreed upon in advance, the user equipment may prestore the correspondence between the at least two multiple-access manners and the time-frequency resource. Then, when the prestored correspondence needs to be used, the prestored correspondence is acquired, where the correspondence is a correspondence agreed upon in advance.

Step 406: The user equipment selects, from the at least two multiple-access manners according to a predetermined condition, a multiple-access manner as a specified multiple-access manner.

Three multiple-access manners separately have respective advantages. For example, the OFDMA multiple-access manner has an advantage of a high rate, the OFDMA+CDMA multiple-access manner has an advantage of a wide coverage area, and the OFDMA+IDMA multiple-access manner has an advantage of suitability for transmission of a large quantity of small data packets. The user equipment may select a most suitable multiple-access manner according to the predetermined condition. Specifically:

When the user equipment needs the advantage of a high rate, the first multiple-access manner is selected. For example, if the predetermined condition includes a QOS priority of a service type, the first multiple-access manner is selected as the specified multiple-access manner when the QOS (quality of service) priority of the service type is relatively high.

When the user equipment needs the advantage of a wide coverage area, the second multiple-access manner is selected. For example, if the predetermined condition includes signal strength, the second multiple-access manner is selected as the specified multiple-access manner when the signal strength is less than a first preset threshold.

When the user equipment needs to transmit a large quantity of small data packets, the third multiple-access manner is selected. For example, if the predetermined condition includes a size of a data block in a service type, the third multiple-access manner is selected as the specified multiple-access manner when the size of the data block transmitted in the service type is less than a fourth preset threshold.

In this embodiment, the predetermined condition includes the multiple-access manner selection range, and the user equipment can select, only from the multiple-access manner selection range, a multiple-access manner as the specified multiple-access manner.

Step 407: The user equipment sends uplink data to the base station in the specified multiple-access manner on a time-frequency resource corresponding to the specified multiple-access manner.

The user equipment sends the uplink data to the base station in the specified multiple-access manner on the time-frequency resource corresponding to the specified multiple-access manner.

Correspondingly, the base station receives the uplink data that is sent by the user equipment in the specified multiple-access manner on the time-frequency resource corresponding to the specified multiple-access manner.

Step 408: The base station searches for a corresponding multiple-access manner corresponding to a specified multiple-access manner that is most recently used by the user equipment.

Generally, a multiple-access manner in which the user equipment sends the uplink data to the base station does not change. However, if an environment in which the user equipment is located changes, or a requirement for a communications system changes, during a communication process, the multiple-access manner in which the user equipment sends the uplink data to the base station changes; therefore, after receiving the uplink data that is sent by the user equipment in the specified multiple-access manner on the time-frequency resource corresponding to the specified multiple-access manner, the base station searches for the corresponding multiple-access manner corresponding to the specified multiple-access manner that is most recently used by the user equipment. For example, if the specified multiple-access manner that is most recently used by the user equipment is the first multiple-access manner, the corresponding multiple-access manner found by the base station is the first multiple-access manner. Before this step, the base station may store a one-to-one correspondence between the specified multiple-access manner and the corresponding multiple-access manner. The one-to-one correspondence may include: if the specified multiple-access manner is the first multiple-access manner, the corresponding multiple-access manner is the first multiple-access manner; if the specified multiple-access manner is the second multiple-access manner, the corresponding multiple-access manner is the second multiple-access manner; and if the specified multiple-access manner is the third multiple-access manner, the corresponding multiple-access manner is any one of the first multiple-access manner, the second multiple-access manner, and the third multiple-access manner.

Step 409: The base station sends downlink data to the user equipment in the found corresponding multiple-access manner on a time-frequency resource corresponding to the corresponding multiple-access manner.

After receiving the uplink data that is sent by the user equipment in the specified multiple-access manner on the time-frequency resource corresponding to the specified multiple-access manner, the base station searches for the corresponding multiple-access manner corresponding to the specified multiple-access manner that is most recently used by the user equipment, and sends, on the time-frequency resource corresponding to the corresponding multiple-access manner, the downlink data to the user equipment in the corresponding multiple-access manner corresponding to the specified multiple-access manner. For example, if the specified multiple-access manner that is most recently used by the user equipment is the first multiple-access manner, the corresponding multiple-access manner found by the base station is the first multiple-access manner, and the base station sends the downlink data to the user equipment in the found first multiple-access manner on the time-frequency resource corresponding to the first multiple-access manner.

Correspondingly, the user equipment receives the downlink data that is sent by the base station in the corresponding multiple-access manner on the time-frequency resource corresponding to the corresponding multiple-access manner.

Step 410: After receiving the downlink data sent by the base station, the user equipment sends a receiving feedback to the base station.

After receiving the downlink data sent by the base station, the user equipment sends the receiving feedback to the base station. The receiving feedback is used to identify that the user equipment has received the downlink data sent by the base station.

Correspondingly, the base station receives the receiving feedback sent by the user equipment.

Step 411: If the base station does not receive the receiving feedback of the user equipment for the downlink data, the base station sends the downlink data again to the user equipment in another multiple-access manner different from the corresponding multiple-access manner in the at least two multiple-access manners.

In a case of normal communication, after sending the downlink data to the user equipment, the base station receives the receiving feedback sent by the user equipment. If the base station does not receive the receiving feedback of the user equipment for the downlink data, it indicates that the user equipment does not receive the downlink data sent by the base station, and therefore, the base station sends the downlink data again to the user equipment in another multiple-access manner different from the corresponding multiple-access manner in the first multiple-access manner, the second multiple-access manner, and the third multiple-access manner. For example, if the corresponding multiple-access manner is the first multiple-access manner, if the base station does not receive the receiving feedback of the user equipment for the downlink data, the downlink data is sent again to the user equipment in the second multiple-access manner on a time-frequency resource corresponding to the second multiple-access manner; and if the base station still does not receive the receiving feedback of the user equipment for the downlink data, the base station sends the downlink data again to the user equipment in the third multiple-access manner on a time-frequency resource corresponding to the third multiple-access manner, until the base station receives the receiving feedback of the user equipment for the downlink data.

Step 412: The user equipment determines, at each predetermined time interval, whether a currently used specified multiple-access manner still satisfies the predetermined condition.

The user equipment may be in a moving state, and may be in a different environment at each time period, or a factor that impedes communication occurs during a communication process of the user equipment, leading to a case in which the predetermined condition may be no longer satisfied; therefore, the user equipment determines, at each predetermined time interval, whether the currently used specified multiple-access manner still satisfies the predetermined condition.

If a determining result is that the currently used specified multiple-access manner still satisfies the predetermined condition, the currently used specified multiple-access manner is kept unchanged.

Step 413: If a determining result is that the currently used specified multiple-access manner does not satisfy the predetermined condition, select again, from the at least two multiple-access manners according to the predetermined condition, a multiple-access manner as the specified multiple-access manner.

In conclusion, according to the communication method provided in this embodiment, user equipment acquires a correspondence between at least two multiple-access manners and a time-frequency resource; a base station receives uplink data that is sent by the user equipment in a specified multiple-access manner on a time-frequency resource corresponding to the specified multiple-access manner; and the base station sends downlink data to the user equipment in a corresponding multiple-access manner on a time-frequency resource corresponding to the corresponding multiple-access manner. In this way, a problem that because one multiple-access manner is used in a same communications system, requirements of different user equipments cannot be met at the same time is resolved, and an effect of meeting requirements of different user equipments is achieved because a same communications system can provide multiple multiple-access manners at the same time for selection by user equipment. In addition, the base station prestores a one-to-one correspondence between the specified multiple-access manner and the corresponding multiple-access manner, so that after receiving the uplink data sent by the user equipment, the base station can send the downlink data to the user equipment in the corresponding multiple-access manner, which is obtained according to the prestored one-to-one correspondence and is associated with the specified multiple-access manner, on the time-frequency resource corresponding to the corresponding multiple-access manner. In this way, a problem that because the base station sends the downlink data in a manner unidentifiable by the user equipment, communication is interrupted is resolved, and an effect of ensuring smoothness of a communication process without significantly increasing device complexity of the user equipment is achieved. In addition, it is checked at every fixed time interval whether a currently used multiple-access manner still satisfies a predetermined condition, to determine whether the multiple-access manner needs to be changed, so as to ensure quality of communication more preferably during a communication process.

Apparatus embodiments of the present invention are provided in the following, and can be configured to execute the method embodiments of the present invention. For technical details that are not disclosed in the apparatus embodiments of the present invention, refer to the method embodiments of the present invention.

Figure 5:
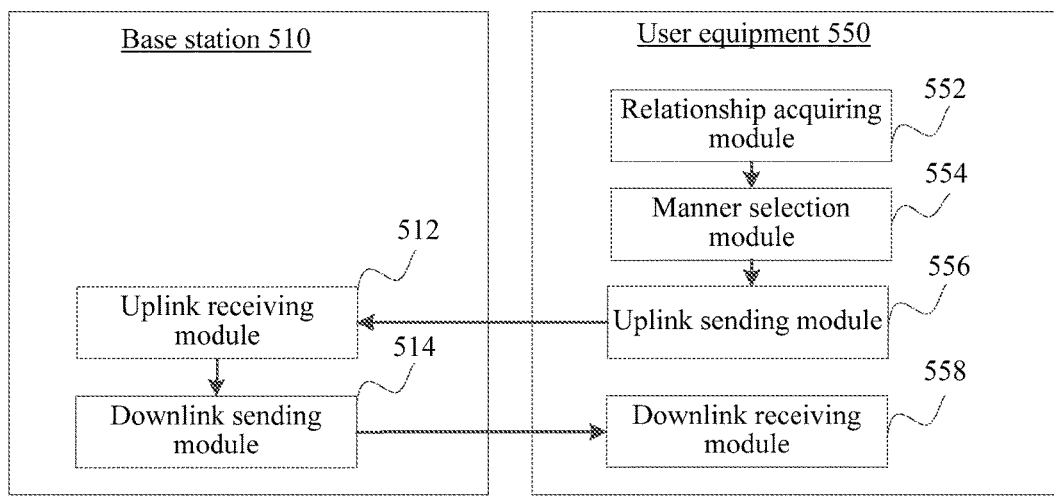
FIG. 5 is a schematic structural diagram of a communications system according to an embodiment of the present invention.

Referring to FIG. 5, FIG. 5 is a schematic structural diagram of a communications system according to an embodiment of the present invention. The communications system includes: a base station 510 and user equipment 550.

The base station 510 includes: an uplink receiving module 512 and a downlink sending module 514.

The uplink receiving module 512 receives uplink data that is sent by the user equipment in a specified multiple-access manner on a time-frequency resource corresponding to the specified multiple-access manner, where the specified multiple-access manner is a multiple-access manner selected by the user equipment from at least two multiple-access manners according to a predetermined condition.

The downlink sending module 514 is configured to send downlink data to the user equipment in a corresponding multiple-access manner on a time-frequency resource corresponding to the corresponding multiple-access manner, where the corresponding multiple-access manner is a multiple-access manner that is obtained by searching the at least two multiple-access manners according to a prestored correspondence and that is associated with the specified multiple-access manner received by the uplink receiving module 512.

The user equipment 550 includes: a relationship acquiring module 552, a manner selection module 554, an uplink sending module 556, and a downlink receiving module 558.

The relationship acquiring module 552 is configured to acquire a correspondence between at least two multiple-access manners and a time-frequency resource.

The manner selection module 554 is configured to select, according to the predetermined condition from the at least two multiple-access manners acquired by the relationship acquiring module 552, a multiple-access manner as the specified multiple-access manner.

The uplink sending module 556 is configured to send the uplink data to the base station in the specified multiple-access manner, selected by the manner selection module 554, on the time-frequency resource corresponding to the specified multiple-access manner.

The downlink receiving module 558 is configured to receive the downlink data that is sent by the base station in the corresponding multiple-access manner on the time-frequency resource corresponding to the corresponding multiple-access manner, where the corresponding multiple-access manner is a multiple-access manner that is obtained by the base station by searching the at least two multiple-access manners according to the prestored correspondence and that is associated with the specified multiple-access manner.

The at least two multiple-access manners include at least two of a first multiple-access manner, a second multiple-access manner, and a third multiple-access manner, the first multiple-access manner is an Orthogonal Frequency Division Multiple Access OFDMA multiple-access manner or a Single-carrier Frequency-Division Multiple Access SC-FDMA multiple-access manner, the second multiple-access manner is an OFDMA+Code Division Multiple Access CDMA multiple-access manner or an SC-FDMA+CDMA multiple-access manner, and the third multiple-access manner is an OFDMA+Interleaver-Division Multiple Access IDMA multiple-access manner or an SC-FDMA+IDMA multiple-access manner.

In conclusion, according to the communications system provided in this embodiment, a base station receives uplink data that is sent by user equipment in a specified multiple-access manner on a time-frequency resource corresponding to the specified multiple-access manner, where the specified multiple-access manner is a multiple-access manner selected by the user equipment from at least two multiple-access manners according to a predetermined condition; and sends downlink data to the user equipment in a corresponding multiple-access manner on a time-frequency resource corresponding to the corresponding multiple-access manner, where the corresponding multiple-access manner is a multiple-access manner that is obtained by searching the at least two multiple-access manners according to a prestored correspondence and that is associated with the specified multiple-access manner. In this way, a problem that because one multiple-access manner is used in a same communications system, requirements of different user equipments cannot be met at the same time is resolved, and an effect of meeting requirements of different user equipments is achieved because a same communications system can provide multiple multiple-access manners at the same time for selection by user equipment.

Figure 6:
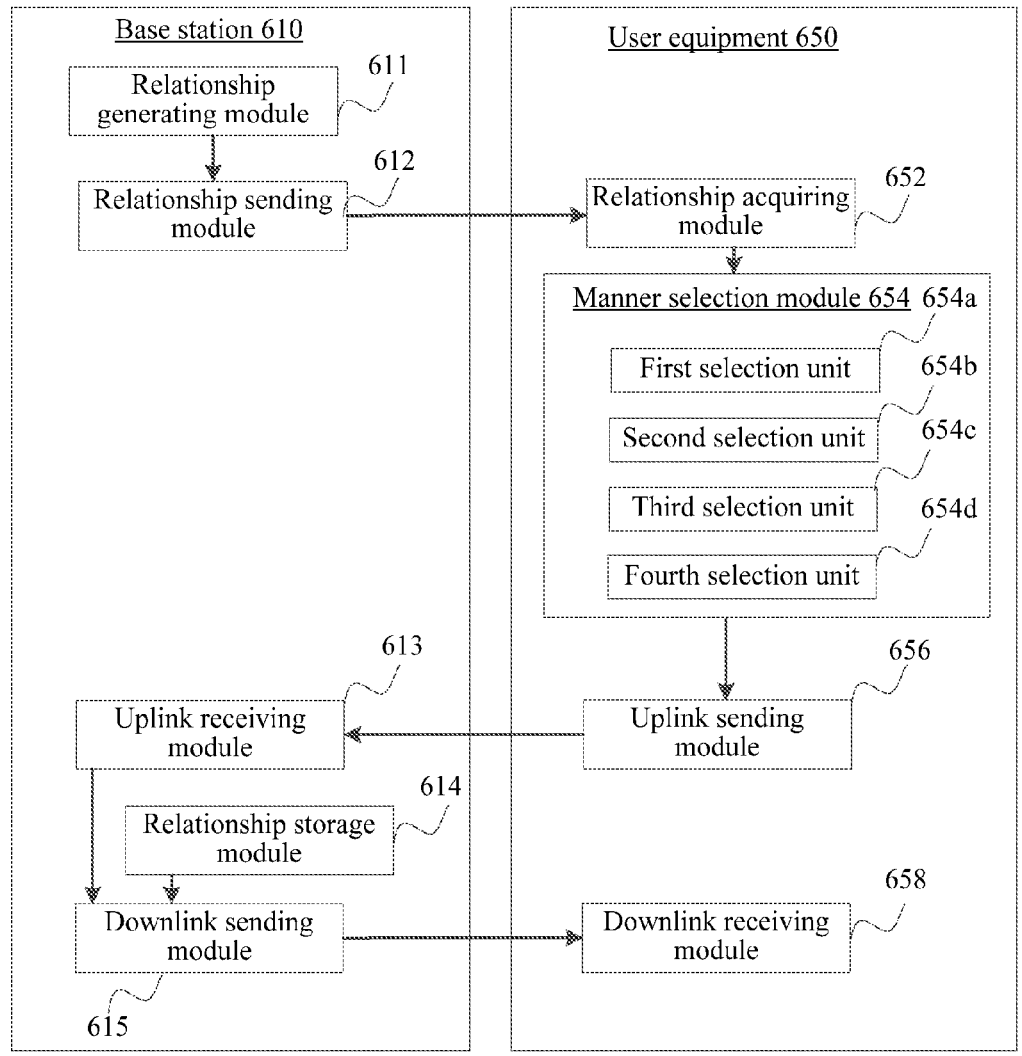
FIG. 6 is a schematic structural diagram of a communications system according to another embodiment of the present invention.

Referring to FIG. 6, FIG. 6 is a schematic structural diagram of a communications system according to another embodiment of the present invention. The communications system includes: a base station 610 and user equipment 650.

The base station 610 includes: a relationship generating module 611, a relationship sending module 612, an uplink receiving module 613, a relationship storage module 614, and a downlink sending module 615.

The relationship generating module 611 is configured to generate a correspondence between at least two multiple-access manners and a time-frequency resource according to a predetermined categorization manner, where the predetermined categorization manner includes any one of three manners: categorization according to a time domain, categorization according to a frequency domain, and categorization according to a time-frequency domain, a first multiple-access manner is an OFDMA multiple-access manner or an SC-FDMA multiple-access manner, a second multiple-access manner is an OFDMA+CDMA multiple-access manner or an SC-FDMA+CDMA multiple-access manner, and a third multiple-access manner is an OFDMA+IDMA multiple-access manner or an SC-FDMA+IDMA multiple-access manner.

The relationship sending module 612 is configured to send the correspondence, generated by the relationship generating module 611, between the at least two multiple-access manners and the time-frequency resource to the user equipment according to a predetermined sending manner, where the predetermined sending manner includes: a notification by using a system broadcast or a notification by using signaling.

The uplink receiving module 613 is configured to receive uplink data that is sent by the user equipment in a specified multiple-access manner on a time-frequency resource corresponding to the specified multiple-access manner, where the specified multiple-access manner is a multiple-access manner selected by the user equipment from the at least two multiple-access manners according to a predetermined condition.

The relationship storage module 614 is configured to store a one-to-one correspondence between the specified multiple-access manner and a corresponding multiple-access manner, where the one-to-one correspondence includes:

if the specified multiple-access manner is the first multiple-access manner, the corresponding multiple-access manner is the first multiple-access manner;

if the specified multiple-access manner is the second multiple-access manner, the corresponding multiple-access manner is the second multiple-access manner; and if the specified multiple-access manner is the third multiple-access manner, the corresponding multiple-access manner is any one of the first multiple-access manner, the second multiple-access manner, and the third multiple-access manner.

The downlink sending module 615 is configured to send downlink data to the user equipment in the corresponding multiple-access manner on a time-frequency resource corresponding to the corresponding multiple-access manner, where the corresponding multiple-access manner is a multiple-access manner that is obtained by searching the at least two multiple-access manners according to the prestored correspondence and that is associated with the specified multiple-access manner received by the uplink receiving module 613.

The user equipment 650 includes: a relationship acquiring module 652, a manner selection module 654, an uplink sending module 656, and a downlink receiving module 658.

The relationship acquiring module 652 is configured to acquire the correspondence between the at least two multiple-access manners and the time-frequency resource.

The manner selection module 654 is configured to select, from the at least two multiple-access manners according to the predetermined condition, a multiple-access manner as the specified multiple-access manner. The predetermined condition includes one of or a combination of more than one of a QOS priority of a service type, signal strength, a size of a data block in a service type, and a multiple-access manner selection range.

Specifically, the manner selection module 654 specifically includes: at least one of a first selection unit 654a, a second selection unit 654b, a third selection unit 654c, and a fourth selection unit 654d.

The first selection unit 654a is configured to: if the predetermined condition includes a QOS priority of a service type, select the first multiple-access manner as the specified multiple-access manner when the QOS priority of the service type is relatively high.

The second selection unit 654b is configured to: if the predetermined condition includes signal strength, select the second multiple-access manner as the specified multiple-access manner when the signal strength is less than a first preset threshold.

The third selection unit 654c is configured to: if the predetermined condition includes a size of a data block in a service type, select the third multiple-access manner as the specified multiple-access manner when the size of the data block transmitted in the service type is less than a fourth preset threshold.

The fourth selection unit 654d is configured to: if the predetermined condition includes a multiple-access manner selection range, select, from a selectable range defined in the multiple-access manner selection range, a multiple-access manner as the specified multiple-access manner.

The uplink sending module 656 is configured to send the uplink data to the base station in the specified multiple-access manner, selected by the manner selection module 654, on the time-frequency resource corresponding to the specified multiple-access manner.

The downlink receiving module 658 is configured to receive the downlink data that is sent by the base station in the corresponding multiple-access manner on the time-frequency resource corresponding to the corresponding multiple-access manner, where the corresponding multiple-access manner is a multiple-access manner that is obtained by the base station by searching the at least two multiple-access manners according to the prestored correspondence and that is associated with the specified multiple-access manner.

In conclusion, according to the communications system provided in this embodiment, user equipment acquires a correspondence between at least two multiple-access manners and a time-frequency resource; a base station receives uplink data that is sent by the user equipment in a specified multiple-access manner on a time-frequency resource corresponding to the specified multiple-access manner; and the base station sends downlink data to the user equipment in a corresponding multiple-access manner on a time-frequency resource corresponding to the corresponding multiple-access manner. In this way, a problem that because one multiple-access manner is used in a same communications system, requirements of different user equipments cannot be met at the same time is resolved, and an effect of meeting requirements of different user equipments is achieved because a same communications system can provide multiple multiple-access manners at the same time for selection by user equipment. In addition, the base station prestores a one-to-one correspondence between the specified multiple-access manner and the corresponding multiple-access manner, so that after receiving the uplink data sent by the user equipment, the base station can send the downlink data to the user equipment in the corresponding multiple-access manner, which is obtained according to the prestored one-to-one correspondence and is associated with the specified multiple-access manner, on the time-frequency resource corresponding to the corresponding multiple-access manner. In this way, a problem that because the base station sends the downlink data in a manner unidentifiable by the user equipment, communication is interrupted is resolved, and an effect of ensuring smoothness of a communication process without significantly increasing device complexity of the user equipment is achieved.

Figure 7:
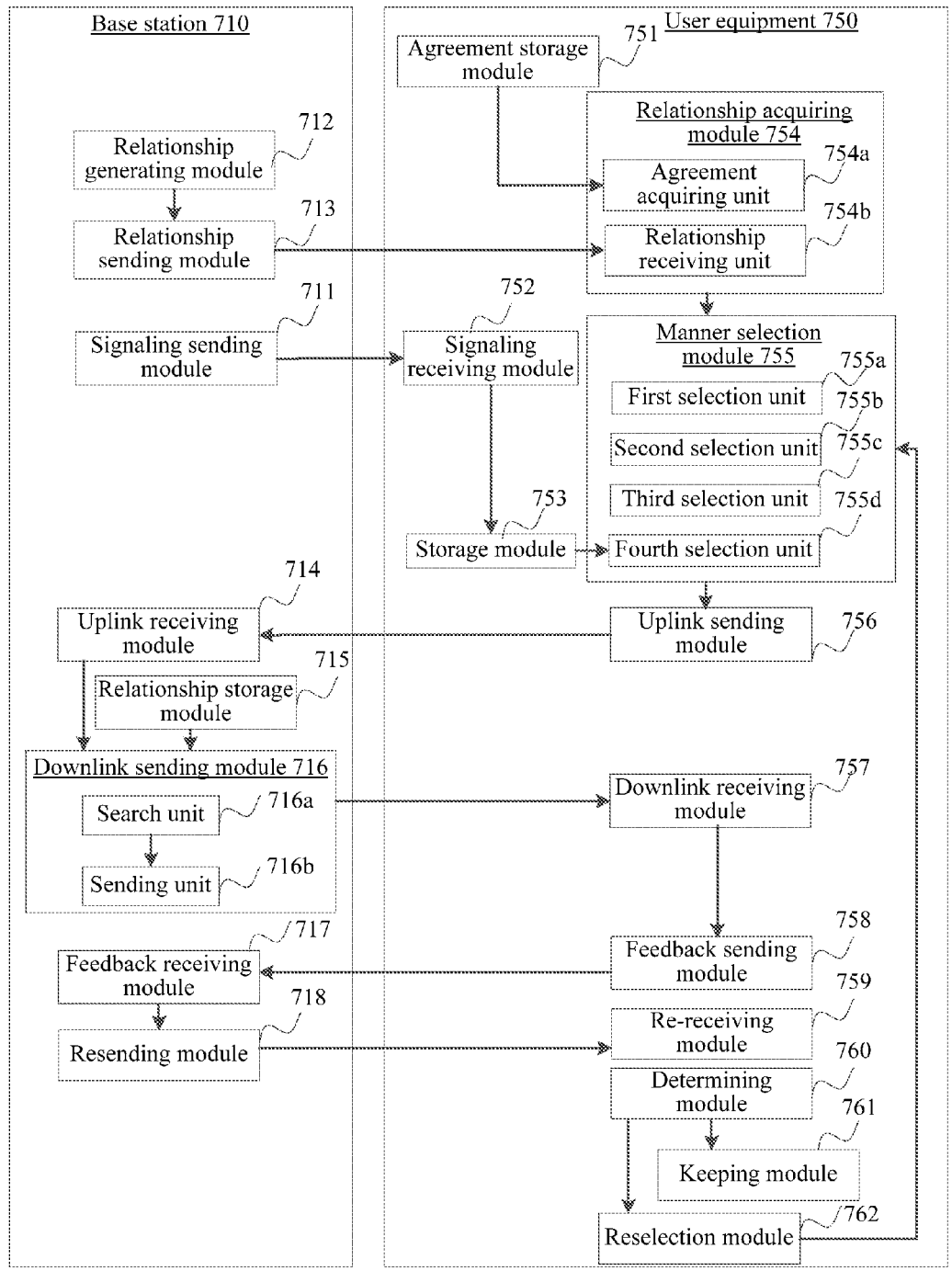
FIG. 7 is a schematic structural diagram of a communications system according to another embodiment of the present invention.

Referring to FIG. 7, FIG. 7 is a schematic structural diagram of a communications system according to another embodiment of the present invention. The communications system includes: a base station 710 and user equipment 750.

The base station 710 includes: a signaling sending module 711, a relationship generating module 712, a relationship sending module 713, an uplink receiving module 714, a relationship storage module 715, a downlink sending module 716, a feedback receiving module 717, and a resending module 718.

The signaling sending module 711 is configured to send signaling used for configuring a multiple-access manner selection range to the user equipment, where the multiple-access manner selection range is a selectable range when the user equipment selects a multiple-access manner from at least two multiple-access manners according to a predetermined condition. The at least two multiple-access manners include any two or all three of a first multiple-access manner, a second multiple-access manner, and a third multiple-access manner, the first multiple-access manner is an Orthogonal Frequency Division Multiple Access OFDMA multiple-access manner or a Single-carrier Frequency-Division Multiple Access SC-FDMA multiple-access manner, the second multiple-access manner is an OFDMA+Code Division Multiple Access CDMA multiple-access manner or an SC-FDMA+CDMA multiple-access manner, and the third multiple-access manner is an OFDMA+Interleaver-Division Multiple Access IDMA multiple-access manner or an SC-FDMA+IDMA multiple-access manner.

The relationship generating module 712 is configured to generate a correspondence between at least two multiple-access manners and a time-frequency resource according to a predetermined categorization manner, where the predetermined categorization manner includes any one of three manners: categorization according to a time domain, categorization according to a frequency domain, and categorization according to a time-frequency domain.

The relationship sending module 713 is configured to send the correspondence between the at least two multiple-access manners and the time-frequency resource to the user equipment according to a predetermined sending manner, where the predetermined sending manner includes: a notification by using a system broadcast or a notification by using signaling.

The uplink receiving module 714 is configured to receive uplink data that is sent by the user equipment in a specified multiple-access manner on a time-frequency resource corresponding to the specified multiple-access manner, where the specified multiple-access manner is a multiple-access manner selected by the user equipment from the at least two multiple-access manners according to the predetermined condition.

The relationship storage module 715 is configured to store a one-to-one correspondence between the specified multiple-access manner and a corresponding multiple-access manner, where the one-to-one correspondence includes: if the specified multiple-access manner is the first multiple-access manner, the corresponding multiple-access manner is the first multiple-access manner; if the specified multiple-access manner is the second multiple-access manner, the corresponding multiple-access manner is the second multiple-access manner; and if the specified multiple-access manner is the third multiple-access manner, the corresponding multiple-access manner is any one of the first multiple-access manner, the second multiple-access manner, and the third multiple-access manner.

The downlink sending module 716 is configured to send downlink data to the user equipment in the corresponding multiple-access manner on a time-frequency resource corresponding to the corresponding multiple-access manner, where the corresponding multiple-access manner is a multiple-access manner that is obtained by searching the at least two multiple-access manners according to the correspondence prestored by the relationship storage module 715 and that is associated with the specified multiple-access manner received by the uplink receiving module 714.

Specifically, the downlink sending module 716 specifically includes: a search unit 716a and a sending unit 716b.

The search unit 716a is configured to search for a corresponding multiple-access manner corresponding to a specified multiple-access manner that is most recently used by the user equipment.

The sending unit 716b is configured to send the downlink data to the user equipment in the corresponding multiple-access manner, found by the search unit 716a, on the time-frequency resource corresponding to the corresponding multiple-access manner.

The feedback receiving module 717 is configured to receive a receiving feedback sent by the user equipment.

The resending module 718 is configured to: if the feedback receiving module 717 does not receive the receiving feedback of the user equipment for the downlink data, send the downlink data again to the user equipment on a time-frequency resource corresponding to another multiple-access manner different from the corresponding multiple-access manner in the at least two multiple-access manners.

The user equipment 750 includes: an agreement storage module 751, a signaling receiving module 752, a storage module 753, a relationship acquiring module 754, a manner selection module 755, an uplink sending module 756, a downlink receiving module 757, a feedback sending module 758, a re-receiving module 759, a determining module 760, a keeping module 761, and a reselection module 762.

The agreement storage module 751 is configured to prestore the multiple-access manner selection range agreed upon in advance.

The signaling receiving module 752 is configured to receive signaling that is used for configuring the multiple-access manner selection range and that is sent by the base station.

The storage module 753 is configured to store the multiple-access manner selection range configured by using the signaling that is sent by the base station and that is received by the signaling receiving module 752. It should be noted that, when the user equipment 750 includes the agreement storage module 751, the user equipment 750 may not include the signaling receiving module 752 or the storage module 753; when the user equipment 750 includes the signaling receiving module 752 and the storage module 753, the user equipment 750 may not include the agreement storage module 751.

The relationship acquiring module 754 is configured to acquire the correspondence between the at least two multiple-access manners and the time-frequency resource.

Specifically, the relationship acquiring module 754 specifically includes:

an agreement acquiring unit 754a, configured to acquire the prestored correspondence, where the correspondence is a correspondence agreed upon in advance;

or, a relationship receiving unit 754b, configured to receive the correspondence that is sent by the base station according to a predetermined sending manner, where the predetermined sending manner includes: a notification by using a system broadcast or a notification by using signaling.

The manner selection module 755 is configured to select, according to the predetermined condition from the at least two multiple-access manners acquired by the relationship acquiring module 754, a multiple-access manner as the specified multiple-access manner. The predetermined condition includes at least one of the following: a QOS priority of a service type, signal strength, a size of a data block in a service type, and a multiple-access manner selection range.

Specifically, the manner selection module 755 specifically includes:

at least one of a first selection unit 755a, a second selection unit 755b, a third selection unit 755c, and a fourth selection unit 755d.

The first selection unit 755a is configured to: if the predetermined condition includes a QOS priority of a service type, select the first multiple-access manner as the specified multiple-access manner when the QOS priority of the service type is relatively high.

The second selection unit 755b is configured to: if the predetermined condition includes signal strength, select the second multiple-access manner as the specified multiple-access manner when the signal strength is less than a first preset threshold.

The third selection unit 755c is configured to: if the predetermined condition includes a size of a data block in a service type, select the third multiple-access manner as the specified multiple-access manner when the size of the data block transmitted in the service type is less than a fourth preset threshold.

The fourth selection unit 755*d* is configured to: if the predetermined condition includes a multiple-access manner selection range, select, from a selectable range defined in the multiple-access manner selection range stored in the agreement storage module 751 or the storage module 753, a multiple-access manner as the specified multiple-access manner.

The uplink sending module 756 is configured to send uplink data to a base station in the specified multiple-access manner, selected by the manner selection module 755, on the time-frequency resource corresponding to the specified multiple-access manner.

The downlink receiving module 757 is configured to receive downlink data that is sent by the base station in the corresponding multiple-access manner on the time-frequency resource corresponding to the corresponding multiple-access manner, where the corresponding multiple-access manner is a multiple-access manner that is obtained by the base station by searching the at least two multiple-access manners according to the prestored correspondence and that is associated with the specified multiple-access manner.

The feedback sending module 758 is configured to send a receiving feedback to the base station after the downlink receiving module 757 receives the downlink data.

The re-receiving module 759 is configured to receive the downlink data sent again by the base station, where the downlink data sent again is sent, after the base station does not receive the receiving feedback of the user equipment for the downlink data sent in the corresponding multiple-access manner on the time-frequency resource corresponding to the corresponding multiple-access manner, to the user equipment again in another multiple-access manner different from the corresponding multiple-access manner in the at least two multiple-access manners.

The determining module 760 is configured to determine, at each predetermined time interval, whether a currently used specified multiple-access manner still satisfies the predetermined condition.

The keeping module 761 is configured to: if a determining result of the determining module 760 is that the currently used specified multiple-access manner still satisfies the predetermined condition, keep the currently used specified multiple-access manner unchanged.

The reselection module 762 is configured to: if the determining result of the determining module 760 is that the currently used specified multiple-access manner does not satisfy the predetermined condition, select again, from the at least two multiple-access manners according to the predetermined condition, a multiple-access manner as the specified multiple-access manner.

In conclusion, according to the communications system provided in this embodiment, user equipment acquires a correspondence between at least two multiple-access manners and a time-frequency resource; a base station receives uplink data that is sent by the user equipment in a specified multiple-access manner on a time-frequency resource corresponding to the specified multiple-access manner; and the base station sends downlink data to the user equipment in a corresponding multiple-access manner on a time-frequency resource corresponding to the corresponding multiple-access manner. In this way, a problem that because one multiple-access manner is used in a same communications system, requirements of different user equipments cannot be met at the same time is resolved, and an effect of meeting requirements of different user equipments is achieved because a same communications system can provide multiple multiple-access manners at the same time for selection by user equipment. In addition, the base station prestores a one-to-one correspondence between the specified multiple-access manner and the corresponding multiple-access manner, so that after receiving the uplink data sent by the user equipment, the base station can send the downlink data to the user equipment in the corresponding multiple-access manner, which is obtained according to the prestored one-to-one correspondence and is associated with the specified multiple-access manner, on the time-frequency resource corresponding to the corresponding multiple-access manner. In this way, a problem that because the base station sends the downlink data in a manner unidentifiable by the user equipment, communication is interrupted is resolved, and an effect of ensuring smoothness of a communication process without significantly increasing device complexity of the user equipment is achieved. In addition, it is checked at every fixed time interval whether a currently used multiple-access manner still satisfies a predetermined condition, to determine whether the multiple-access manner needs to be changed, so as to ensure quality of communication more preferably during a communication process.

Figure 8:
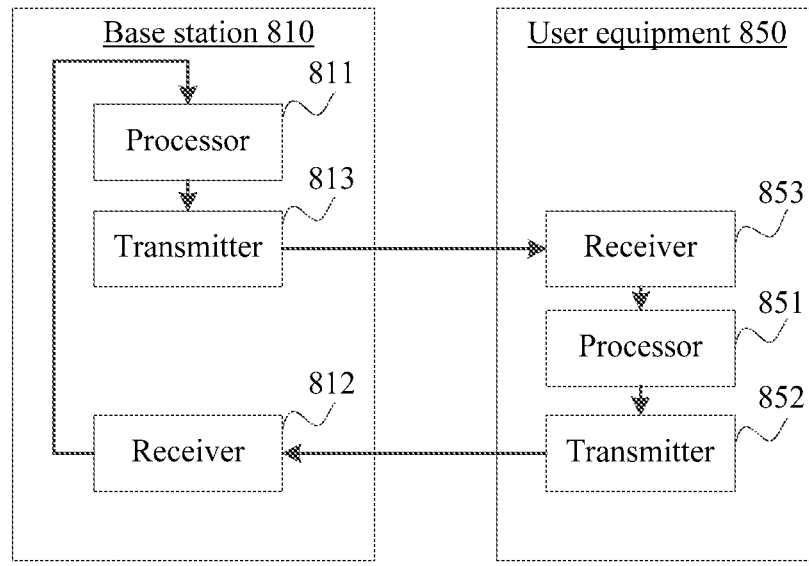
FIG. 8 is a structural block diagram of a communications system according to an embodiment of the present invention.

Referring to FIG. 8, FIG. 8 is a structural block diagram of a communications system according to an embodiment of the present invention. The communications system includes: a base station 810 and user equipment 850.

The base station 810 includes: a processor 811, a receiver 812, and a transmitter 813.

The receiver 812 is configured to receive uplink data that is sent by the user equipment in a specified multiple-access manner on a time-frequency resource corresponding to the specified multiple-access manner, where the specified multiple-access manner is a multiple-access manner selected by the user equipment from at least two multiple-access manners according to a predetermined condition.

The transmitter 813 is configured to send downlink data to the user equipment in a corresponding multiple-access manner on a time-frequency resource corresponding to the corresponding multiple-access manner, where the corresponding multiple-access manner is a multiple-access manner that is obtained by the processor 811 by searching the at least two multiple-access manners according to a prestored correspondence and that is associated with the specified multiple-access manner.

The at least two multiple-access manners include at least two of a first multiple-access manner, a second multiple-access manner, and a third multiple-access manner, the first multiple-access manner is an Orthogonal Frequency Division Multiple Access OFDMA multiple-access manner or a Single-carrier Frequency-Division Multiple Access SC-FDMA multiple-access manner, the second multiple-access manner is an OFDMA+Code Division Multiple Access CDMA multiple-access manner or an SC-FDMA+CDMA multiple-access manner, and the third multiple-access manner is an OFDMA+Interleaver-Division Multiple Access IDMA multiple-access manner or an SC-FDMA+IDMA multiple-access manner.

The user equipment 850 includes: a processor 851, a transmitter 852, and a receiver 853.

The processor 851 is configured to acquire a correspondence between at least two multiple-access manners and a time-frequency resource.

The processor 851 is further configured to select, from the at least two multiple-access manners according to the predetermined condition, a multiple-access manner as the specified multiple-access manner.

The transmitter 852 is configured to send the uplink data to the base station in the specified multiple-access manner, selected by the processor 851, on the time-frequency resource corresponding to the specified multiple-access manner.

The receiver 853 is configured to receive the downlink data that is sent by the base station in the corresponding multiple-access manner on the time-frequency resource corresponding to the corresponding multiple-access manner, where the corresponding multiple-access manner is a multiple-access manner that is obtained by the base station by searching the at least two multiple-access manners according to the prestored correspondence and that is associated with the specified multiple-access manner.

In conclusion, according to the communications system provided in this embodiment, a base station receives uplink data that is sent by user equipment in a specified multiple-access manner on a time-frequency resource corresponding to the specified multiple-access manner, where the specified multiple-access manner is a multiple-access manner selected by the user equipment from at least two multiple-access manners according to a predetermined condition; and sends downlink data to the user equipment in a corresponding multiple-access manner on a time-frequency resource corresponding to the corresponding multiple-access manner, where the corresponding multiple-access manner is a multiple-access manner that is obtained by searching the at least two multiple-access manners according to a prestored correspondence and that is associated with the specified multiple-access manner. In this way, a problem that because one multiple-access manner is used in a same communications system, requirements of different user equipments cannot be met at the same time is resolved, and an effect of meeting requirements of different user equipments is achieved because a same communications system can provide multiple multiple-access manners at the same time for selection by user equipment.

Figure 9:
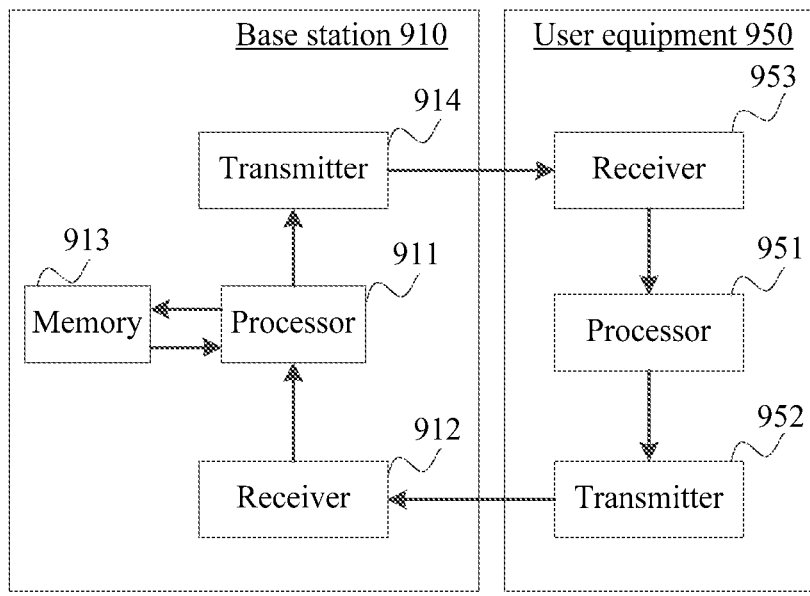
FIG. 9 is a structural block diagram of a communications system according to another embodiment of the present invention.

Referring to FIG. 9, FIG. 9 is a structural block diagram of a communications system according to another embodiment of the present invention. The communications system includes: a base station 910 and user equipment 950.

The base station 910 includes: a processor 911, a receiver 912, a memory 913, and a transmitter 914.

The processor 911 is configured to generate a correspondence between at least two multiple-access manners and a time-frequency resource according to a predetermined categorization manner, where the predetermined categorization manner includes any one of three manners: categorization according to a time domain, categorization according to a frequency domain, and categorization according to a time-frequency domain, the at least two multiple-access manners include at least two of a first multiple-access manner, a second multiple-access manner, and a third multiple-access manner, the first multiple-access manner is an Orthogonal Frequency Division Multiple Access OFDMA multiple-access manner or a Single-carrier Frequency-Division Multiple Access SC-FDMA multiple-access manner, the second multiple-access manner is an OFDMA+Code Division Multiple Access CDMA multiple-access manner or an SC-FDMA+CDMA multiple-access manner, and the third multiple-access manner is an OFDMA+Interleaver-Division Multiple Access IDMA multiple-access manner or an SC-FDMA+IDMA multiple-access manner.

The transmitter is further configured to send the correspondence between the at least two multiple-access manners and the time-frequency resource to the user equipment according to a predetermined sending manner, where the predetermined sending manner includes: a notification by using a system broadcast or a notification by using signaling.

The receiver 912 is configured to receive uplink data that is sent by the user equipment in a specified multiple-access manner on a time-frequency resource corresponding to the specified multiple-access manner, where the specified multiple-access manner is a multiple-access manner selected by the user equipment from the at least two multiple-access manners according to a predetermined condition.

The memory 913 is configured to store a one-to-one correspondence between the specified multiple-access manner and a corresponding multiple-access manner, where the one-to-one correspondence includes: if the specified multiple-access manner is the first multiple-access manner, the corresponding multiple-access manner is the first multiple-access manner; if the specified multiple-access manner is the second multiple-access manner, the corresponding multiple-access manner is the second multiple-access manner; and if the specified multiple-access manner is the third multiple-access manner, the corresponding multiple-access manner is any one of the first multiple-access manner, the second multiple-access manner, and the third multiple-access manner.

The transmitter 914 is configured to send downlink data to the user equipment in the corresponding multiple-access manner on a time-frequency resource corresponding to the corresponding multiple-access manner, where the corresponding multiple-access manner is a multiple-access manner that is obtained by the processor by searching the at least two multiple-access manners according to the correspondence prestored by the memory 913 and that is associated with the specified multiple-access manner.

The user equipment 950 includes: a processor 951, a transmitter 952, and a receiver 953.

The processor 951 is configured to acquire the correspondence between the at least two multiple-access manners and the time-frequency resource.

The processor 951 is further configured to select, from the at least two multiple-access manners according to the predetermined condition, a multiple-access manner as the specified multiple-access manner.

Specifically, the processor 951 is specifically configured to: if the predetermined condition includes a QOS priority of a service type, select the first multiple-access manner as the specified multiple-access manner when the QOS priority of the service type is relatively high; the processor 951 is further specifically configured to: if the predetermined condition includes signal strength, select the second multiple-access manner as the specified multiple-access manner when the signal strength is less than a first preset threshold; the processor 951 is further specifically configured to: if the predetermined condition includes a size of a data block in a service type, select the third multiple-access manner as the specified multiple-access manner when the size of the data block transmitted in the service type is less than a fourth preset threshold; and the processor 951 is further specifically configured to: if the predetermined condition includes a multiple-access manner selection range, select, from a selectable range defined in the multiple-access manner selection range, a multiple-access manner as the specified multiple-access manner.

The transmitter 952 is configured to send the uplink data to the base station in the specified multiple-access manner, selected by the processor 951, on the time-frequency resource corresponding to the specified multiple-access manner.

The receiver 953 is configured to receive the downlink data that is sent by the base station in the corresponding multiple-access manner on the time-frequency resource corresponding to the corresponding multiple-access manner, where the corresponding multiple-access manner is a multiple-access manner that is obtained by the base station by searching the at least two multiple-access manners according to the prestored correspondence and that is associated with the specified multiple-access manner.

In conclusion, according to the communications system provided in this embodiment, user equipment acquires a correspondence between at least two multiple-access manners and a time-frequency resource; a base station receives uplink data that is sent by the user equipment in a specified multiple-access manner on a time-frequency resource corresponding to the specified multiple-access manner; and the base station sends downlink data to the user equipment in a corresponding multiple-access manner on a time-frequency resource corresponding to the corresponding multiple-access manner. In this way, a problem that because one multiple-access manner is used in a same communications system, requirements of different user equipments cannot be met at the same time is resolved, and an effect of meeting requirements of different user equipments is achieved because a same communications system can provide multiple multiple-access manners at the same time for selection by user equipment. In addition, the base station prestores a one-to-one correspondence between the specified multiple-access manner and the corresponding multiple-access manner, so that after receiving the uplink data sent by the user equipment, the base station can send the downlink data to the user equipment in the corresponding multiple-access manner, which is obtained according to the prestored one-to-one correspondence and is associated with the specified multiple-access manner, on the time-frequency resource corresponding to the corresponding multiple-access manner. In this way, a problem that because the base station sends the downlink data in a manner unidentifiable by the user equipment, communication is interrupted is resolved, and an effect of ensuring smoothness of a communication process without significantly increasing device complexity of the user equipment is achieved.

Figure 10:
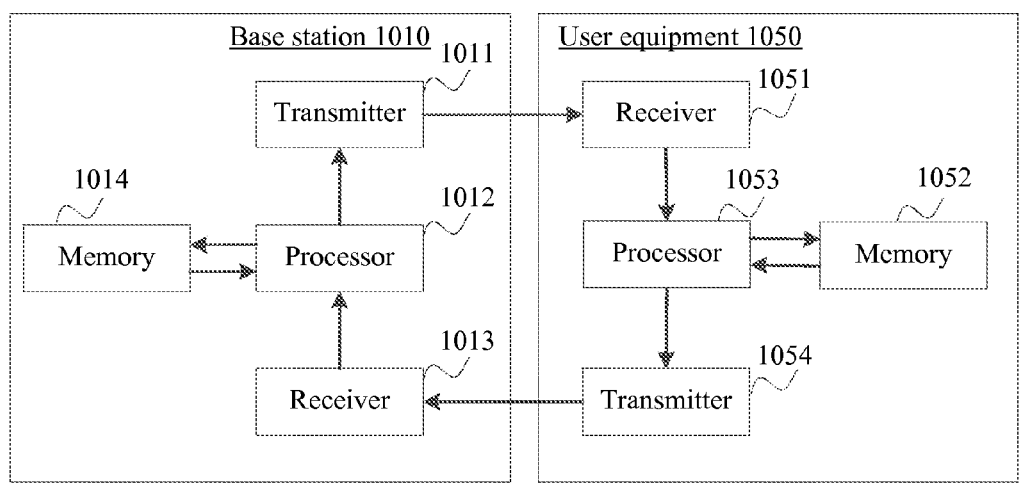
FIG. 10 is a structural block diagram of a communications system according to another embodiment of the present invention.

Referring to FIG. 10, FIG. 10 is a structural block diagram of a communications system according to another embodiment of the present invention. The communications system includes: a base station 1010 and user equipment 1050.

The base station 1010 includes: a transmitter 1011, a processor 1012, a receiver 1013, and a memory 1014.

The transmitter 1011 is configured to send signaling used for configuring a multiple-access manner selection range to the user equipment, where the multiple-access manner selection range is a selectable range when the user equipment selects a multiple-access manner from at least two multiple-access manners according to a predetermined condition. The first multiple-access manner is an OFDMA multiple-access manner or an SC-FDMA multiple-access manner, a second multiple-access manner is an OFDMA+CDMA multiple-access manner or an SC-FDMA+CDMA multiple-access manner, and a third multiple-access manner is an OFDMA+IDMA multiple-access manner or an SC-FDMA+IDMA multiple-access manner.

The processor 1012 is further configured to generate a correspondence between at least two multiple-access manners and a time-frequency resource according to a predetermined categorization manner, where the predetermined categorization manner includes any one of three manners: categorization according to a time domain, categorization according to a frequency domain, and categorization according to a time-frequency domain.

The transmitter 1011 is further configured to send the correspondence between the at least two multiple-access manners and the time-frequency resource to the user equipment according to a predetermined sending manner, where the predetermined sending manner includes: a notification by using a system broadcast or a notification by using signaling.

The receiver 1013 is configured to receive uplink data that is sent by the user equipment in a specified multiple-access manner on a time-frequency resource corresponding to the specified multiple-access manner, where the specified multiple-access manner is a multiple-access manner selected by the user equipment from the at least two multiple-access manners according to the predetermined condition.

The memory 1014 is configured to store a one-to-one correspondence between the specified multiple-access manner and a corresponding multiple-access manner, where the one-to-one correspondence includes: if the specified multiple-access manner is the first multiple-access manner, the corresponding multiple-access manner is the first multiple-access manner; if the specified multiple-access manner is the second multiple-access manner, the corresponding multiple-access manner is the second multiple-access manner; and if the specified multiple-access manner is the third multiple-access manner, the corresponding multiple-access manner is any one of the first multiple-access manner, the second multiple-access manner, and the third multiple-access manner.

The transmitter 1011 is further configured to send downlink data to the user equipment in the corresponding multiple-access manner on a time-frequency resource corresponding to the corresponding multiple-access manner, where the corresponding multiple-access manner is a multiple-access manner that is obtained by the processor by searching the at least two multiple-access manners according to the prestored correspondence and that is associated with the specified multiple-access manner.

Specifically, the processor 1012 is further configured to search for a corresponding multiple-access manner corresponding to a specified multiple-access manner that is most recently used by the user equipment; and the transmitter 1011 is specifically configured to send the downlink data to the user equipment in the corresponding multiple-access manner, found by the processor 1012, on the time-frequency resource corresponding to the corresponding multiple-access manner.

The receiver 1013 is further configured to receive a receiving feedback sent by the user equipment.

The transmitter 1011 is configured to: if the receiver 1013 does not receive the receiving feedback of the user equipment for the downlink data, send the downlink data again to the user equipment on a time-frequency resource corresponding to another multiple-access manner different from the corresponding multiple-access manner in the at least two multiple-access manners.

The user equipment 1050 includes: a receiver 1051, a memory 1052, a processor 1053, and a transmitter 1054.

The memory 1052 is configured to prestore the multiple-access manner selection range agreed upon in advance, where the multiple-access manner selection range is a selectable range when user equipment selects a multiple-access manner from the at least two multiple-access manners according to a service type.

Alternatively, the receiver 1051 is configured to receive signaling that is used for configuring the multiple-access manner selection range and that is sent by a base station, and the memory 1052 is further configured to store the multiple-access manner selection range configured by using the signaling that is sent by the base station and that is received by the receiver 1051.

The processor 1053 is configured to acquire the correspondence between the at least two multiple-access manners and the time-frequency resource. Specifically, the processor 1053 is specifically configured to acquire the prestored correspondence, where the correspondence is a correspondence agreed upon in advance; or, the processor 1053 is further specifically configured to control the receiver 1051 to receive the correspondence that is sent by the base station according to a predetermined sending manner, where the predetermined sending manner includes: a notification by using a system broadcast or a notification by using signaling.

The processor 1053 is further configured to select, from the at least two multiple-access manners according to the predetermined condition, a multiple-access manner as the specified multiple-access manner, where the predetermined condition includes one of or a combination of more than one of a QOS priority of a service type, signal strength, a size of a data block in a service type, and a multiple-access manner selection range.

Specifically, the processor 1053 is specifically configured to: if the predetermined condition includes a QOS priority of a service type, select the first multiple-access manner as the specified multiple-access manner when the QOS priority of the service type is relatively high; the processor 1053 is further specifically configured to: if the predetermined condition includes signal strength, select the second multiple-access manner as the specified multiple-access manner when the signal strength is less than a first preset threshold; the processor 1053 is further specifically configured to: if the predetermined condition includes a size of a data block in a service type, select the third multiple-access manner as the specified multiple-access manner when the size of the data block transmitted in the service type is less than a fourth preset threshold; and the processor 1053 is further specifically configured to: if the predetermined condition includes a multiple-access manner selection range, select, in a selectable range defined in the multiple-access manner selection range stored in the memory 1052, a multiple-access manner as the specified multiple-access manner.

The transmitter 1054 is configured to send the uplink data to the base station on the time-frequency resource corresponding to the specified multiple-access manner selected by the processor 1053.

The receiver 1051 is further configured to receive the downlink data that is sent by the base station in the corresponding multiple-access manner on the time-frequency resource corresponding to the corresponding multiple-access manner, where the corresponding multiple-access manner is a multiple-access manner that is obtained by the base station by searching the at least two multiple-access manners according to the prestored correspondence and that is associated with the specified multiple-access manner.

The transmitter 1054 is further configured to send a receiving feedback to the base station after the receiver 1051 receives the downlink data.

The receiver 1051 is further configured to receive the downlink data sent again by the base station, where the downlink data sent again is sent, after the base station does not receive the receiving feedback of the user equipment for the downlink data sent in the corresponding multiple-access manner on the time-frequency resource corresponding to the corresponding multiple-access manner, to the user equipment again in another multiple-access manner different from the corresponding multiple-access manner in the at least two multiple-access manners.

The processor 1053 is further configured to determine, at each predetermined time interval, whether a currently used specified multiple-access manner still satisfies the predetermined condition.

The processor 1053 is further configured to: if it is determined that the currently used specified multiple-access manner still satisfies the predetermined condition, keep the currently used specified multiple-access manner unchanged.

The processor 1053 is further configured to: if it is determined that the currently used specified multiple-access manner does not satisfy the predetermined condition, select again, from the at least two multiple-access manners according to the predetermined condition, a multiple-access manner as the specified multiple-access manner.

In conclusion, according to the communications system provided in this embodiment, user equipment acquires a correspondence between at least two multiple-access manners and a time-frequency resource; a base station receives uplink data that is sent by the user equipment in a specified multiple-access manner on a time-frequency resource corresponding to the specified multiple-access manner; and the base station sends downlink data to the user equipment in a corresponding multiple-access manner on a time-frequency resource corresponding to the corresponding multiple-access manner. In this way, a problem that because one multiple-access manner is used in a same communications system, requirements of different user equipments cannot be met at the same time is resolved, and an effect of meeting requirements of different user equipments is achieved because a same communications system can provide multiple multiple-access manners at the same time for selection by user equipment. In addition, the base station prestores a one-to-one correspondence between the specified multiple-access manner and the corresponding multiple-access manner, so that after receiving the uplink data sent by the user equipment, the base station can send the downlink data to the user equipment in the corresponding multiple-access manner, which is obtained according to the prestored one-to-one correspondence and is associated with the specified multiple-access manner, on the time-frequency resource corresponding to the corresponding multiple-access manner. In this way, a problem that because the base station sends the downlink data in a manner unidentifiable by the user equipment, communication is interrupted is resolved, and an effect of ensuring smoothness of a communication process without significantly increasing device complexity of the user equipment is achieved. In addition, it is checked at every fixed time interval whether a currently used multiple-access manner still satisfies a predetermined condition, to determine whether the multiple-access manner needs to be changed, so as to ensure quality of communication more preferably during a communication process.

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, an optical disc, or the like.

The foregoing descriptions are merely exemplary embodiments of the present invention, but are not intended to limit the present invention. Any modification, equivalent replacement, and improvement made without departing from the spirit and principle of the present invention shall fall within the protection scope of the present invention.

What is claimed is:

1. A communication method comprising:
receiving, by a base station, uplink data that is sent by user equipment in a first multiple-access manner on a first time-frequency resource, wherein the first time-frequency resource is corresponding to the first multiple-access manner, the first multiple-access manner is selected by the user equipment from at least two multiple-access manners; and
sending, by the base station, downlink data to the user equipment in a second multiple-access manner on a second time-frequency resource,
wherein the second time-frequency resource is corresponding to the second multiple-access manner, and the second multiple-access manner is associated with the first multiple-access manner and is obtained according to a prestored first correspondence between the first multiple-access manner and the second multiple-access manner,
wherein the at least two multiple-access manners comprise at least two of a third multiple-access manner, a fourth multiple-access manner, and a fifth multiple-access manner, the third multiple-access manner is one of an Orthogonal Frequency Division Multiple Access (OFDMA) multiple-access manner and a Single-carrier Frequency-Division Multiple Access (SC-FDMA) multiple-access manner, the fourth multiple-access manner is one of an OFDMA+Code Division Multiple Access (CDMA) multiple-access manner and an SC-FDMA+CDMA multiple-access manner, and the fifth multiple-access manner is one of an OFDMA+Interleaver-Division Multiple Access (IDMA) multiple-access manner and an SC-FDMA+IDMA multiple-access manner.

2. The method according to claim 1, before the receiving uplink data, further comprising:
sending a second correspondence between the at least two multiple-access manners and time-frequency resources to the user equipment according to a predetermined sending manner, wherein
the predetermined sending manner comprises one of a notification by using a system broadcast or a notification by using signaling.

3. The method according to claim 1, before sending the downlink data to the user equipment, the method further comprising:
storing the first correspondence between the first multiple-access manner and the second multiple-access manner, wherein the first correspondence comprises:
if the first multiple-access manner is the third multiple-access manner, the second multiple-access manner is the third multiple-access manner;
if the first multiple-access manner is the fourth multiple-access manner, the second multiple-access manner is the fourth multiple-access manner; and
if the first multiple-access manner is the fifth multiple-access manner, the second multiple-access manner is any one of the third multiple-access manner, the fourth multiple-access manner, and the fifth multiple-access manner.

4. The method according to claim 1, wherein the sending downlink data to the user equipment comprises:
searching for the second multiple-access manner associated with the first multiple-access manner that is most recently used by the user equipment; and
sending the downlink data to the user equipment in the second multiple-access manner on the second time-frequency resource.

5. The method according to claim 1, after the sending downlink data to the user equipment, further comprising:
if a feedback of the user equipment for the downlink data is not received, sending again the downlink data to the user equipment in another multiple-access manner different from the second multiple-access manner in the at least two multiple-access manners.

6. A communication method comprising:
acquiring, by user equipment, a second correspondence between at least two multiple-access manners and time-frequency resources;
selecting, by the user equipment from the at least two multiple-access manners according to a predetermined condition, a first multiple-access manner;
sending, by the user equipment, uplink data to a base station in the first multiple-access manner on a first time-frequency resource, wherein the first time-frequency resource is corresponding to the first multiple-access manner in the second correspondence; and
receiving, by the user equipment from the base station, downlink data in a second multiple-access manner on a second time-frequency resource, wherein the second time-frequency resource is corresponding to the second multiple-access manner in the second correspondence, wherein the second multiple-access manner is obtained by the base station according to a first correspondence in which the second multiple-access manner is associated with the first multiple-access manner, wherein
the at least two multiple-access manners comprise at least two of a third multiple-access manner, a fourth multiple-access manner, and a fifth multiple-access manner, the third multiple-access manner is one of an Orthogonal Frequency Division Multiple Access (OFDMA) multiple-access manner and a Single-carrier Frequency-Division Multiple Access (SC-FDMA) multiple-access manner, the fourth multiple-access manner is an OFDMA+Code Division Multiple Access (CDMA) multiple-access manner or an SC-FDMA+CDMA multiple-access manner, and the fifth multiple-access manner is an OFDMA+Interleaver-Division Multiple Access (IDMA) multiple-access manner or an SC-FDMA+IDMA multiple-access manner.

7. The method according to claim 6, wherein the second correspondence is agreed upon with the base station in advance; or, the acquiring a second correspondence comprises:
receiving the second correspondence from the base station via system broadcast or signaling.

8. The method according to claim 6, wherein the predetermined condition for selecting the first multiple-access manner comprises one of:
a quality of service (QOS) priority of the service type, selecting the third multiple-access manner as the first multiple-access manner when the QOS priority of the service type is relatively high;
signal strength, selecting the fourth multiple-access manner as the first multiple-access manner when the signal strength is less than a first preset threshold;
a size of a data block in a service type, selecting the fifth multiple-access manner as the first multiple-access manner when the size of the data block in the service type is less than a fourth preset threshold; and
a multiple-access manner selection range, selecting, from a selectable range defined in the multiple-access manner selection range, a multiple-access manner as the first multiple-access manner.

9. The method according to claim 8, wherein the multiple-access manner selection range is prestored by the user equipment, wherein the multiple-access manner selection range is agreed upon with the base station in advance;
or before selecting the predetermined condition, a first multiple-access manner, the method further comprises receiving, from the base station, signaling that is used for configuring the multiple-access manner selection range.

10. The method according to claim 6, after the receiving downlink data, further comprising:
receiving the downlink data sent again by the base station in another multiple-access manner different from the second multiple-access manner, wherein the downlink data is sent again in case that the base station does not receive a feedback of the user equipment for the downlink data sent in the second multiple-access manner.

11. A base station comprising:
a processor, coupled with a receiver, a transmitter, and a memory, wherein
the receiver is configured to receive uplink data from user equipment in a first multiple-access manner on a first time-frequency resource, wherein the first time-frequency resource is corresponding to the first multiple-access manner, and the first multiple-access manner is selected by the user equipment from at least two multiple-access manners; and
the transmitter is configured to send downlink data to the user equipment in a second multiple-access manner on a second time-frequency resource, wherein the second time-frequency resource is corresponding to the second multiple-access manner, and the second multiple-access manner is obtained by the processor according to a first correspondence in which the second multiple-access manner is associated with the first multiple-access manner, wherein
the at least two multiple-access manners comprise at least two of a third multiple-access manner, a fourth multiple-access manner, and a fifth multiple-access manner, the third multiple-access manner is one of an Orthogonal Frequency Division Multiple Access (OFDMA) multiple-access manner and a Single-carrier Frequency-Division Multiple Access (SC-FDMA) multiple-access manner, the fourth multiple-access manner is one of an OFDMA+Code Division Multiple Access (CDMA) multiple-access manner and an SC-FDMA+CDMA multiple-access manner, and the fifth multiple-access manner is one of OFDMA+Interleaver-Division Multiple Access (IDMA) multiple-access manner and an SC-FDMA+IDMA multiple-access manner.

12. The base station according to claim 11, wherein the transmitter is further configured to send a second correspondence between the at least two multiple-access manners and time-frequency resources to the user equipment according to a predetermined sending manner, and
the predetermined sending manner comprises one of a notification by using a system broadcast or a notification by using signaling.

13. The base station according to claim 11, wherein the processor is further configured to generate the second correspondence between the at least two multiple-access manners and the time-frequency resources according to a predetermined categorization manner, and the predetermined categorization manner comprises any one of three manners: categorization according to a time domain, categorization according to a frequency domain, and categorization according to a time-frequency domain.

14. The base station according to claim 11, wherein the memory is further configured to store the first correspondence, and the first correspondence comprises:
if the first multiple-access manner is the third multiple-access manner, the second multiple-access manner is the third multiple-access manner;
if the first multiple-access manner is the fourth multiple-access manner, the fourth multiple-access manner is the second multiple-access manner; and
if the first multiple-access manner is the fifth multiple-access manner, the second multiple-access manner is any one of the third multiple-access manner, the fourth multiple-access manner, and the fifth multiple-access manner.

15. The base station according to claim 11, wherein the processor is further configured to search for the second multiple-access manner that is associated with the first multiple-access manner most recently used by the user equipment and that is received by the receiver; and
the transmitter is further configured to send the downlink data to the user equipment in the second multiple-access manner on the second time-frequency resource.

16. User equipment, comprising:
a processor, coupled with a transmitter, a receiver, and a memory, wherein
the processor is configured to acquire a second correspondence between at least two multiple-access manners and time-frequency resources, and select, from the at least two multiple-access manners according to a predetermined condition, a first multiple-access manner;
the transmitter is configured to send uplink data to a base station in the first multiple-access manner on a first time-frequency resource which is corresponding to the first multiple-access manner; and
the receiver is configured to receive, from the base station, downlink data in a second multiple-access manner on a second time-frequency resource, wherein the second time-frequency resource is corresponding to the second multiple-access manner, wherein the second multiple-access manner is obtained by the base station according to a prestored first correspondence between the first multiple-access manner and the second multiple-access manner, wherein
the at least two multiple-access manners comprise at least two of a third t multiple-access manner, a fourth multiple-access manner, and a fifth multiple-access manner, the third multiple-access manner is one of an Orthogonal Frequency Division Multiple Access (OFDMA) multiple-access manner and a Single-carrier Frequency-Division Multiple Access (SC-FDMA) multiple-access manner, the fourth multiple-access manner is one of an OFDMA+Code Division Multiple Access CDMA multiple-access manner and an SC-FDMA+CDMA multiple-access manner, and the fifth multiple-access manner is one of an OFDMA+ Interleaver-Division Multiple Access (IDMA) multiple-access manner and an SC-FDMA+IDMA multiple-access manner.

17. The user equipment according to claim 16, wherein the memory is configured to store the second correspondence which is agreed upon with the base station in advance;

or, the receiver is further configured to receive, from the base station, the second correspondence via a system broadcast or signaling.

18. The user equipment according to claim 16, wherein when the predetermined condition
   (a) is a quality of service (QOS) priority of a service type, the processor is configured to select the third multiple-access manner as the first multiple-access manner when the QOS priority of the service type is relatively high;
   (b) is signal strength, the processor is configured to select the fourth multiple-access manner as the first multiple-access manner when the signal strength is less than a first preset threshold;
   (c) is a size of a data block in a service type, the processor is configured to select the fifth multiple-access manner as the first multiple-access manner when the size of the data block transmitted in the service type is less than a fourth preset threshold; and
   (d) is a multiple-access manner selection range, the processor is configured to select, from a selectable range defined in the multiple-access manner selection range, a multiple-access manner as the first multiple-access manner.

19. The user equipment according to claim 18, wherein the memory is configured to prestore the multiple-access manner selection range, wherein the multiple-access manner selection range is a multiple-access manner selection range agreed upon with the base station in advance; or, the receiver is further configured to receive, from the base station, signaling that is used for configuring the multiple-access manner selection range; and
   the memory is further configured to store the multiple-access manner selection range that is configured by using the signaling.

20. The user equipment according to claim 18, wherein there are two or three selectable multiple-access manners in the multiple-access manner selection range; and
   the processor is further configured to
   determine, at each predetermined time interval, whether the first multiple-access manner currently used by the transmitter still satisfies the predetermined condition;
   if a determining result is that the first multiple-access manner still satisfies the predetermined condition, keep the first specified multiple-access manner unchanged; and
   if a determining result is that the first multiple-access manner does not satisfy the predetermined condition, select again, from the at least two multiple-access manners according to the predetermined condition, a multiple-access manner as a new multiple-access manner.

* * * * *